United States Patent
Sinclair et al.

(10) Patent No.: US 10,889,355 B2
(45) Date of Patent: *Jan. 12, 2021

(54) SMART BUOYANCY COMPENSATION DEVICES

(71) Applicant: Marine Depth Control Engineering, LLC, Boca Raton, FL (US)

(72) Inventors: Andrew Craig Sinclair, Southwater (GB); Christopher Charles Webb, Les Collons (CH)

(73) Assignee: Marine Depth Control Engineering, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,923

(22) Filed: Aug. 13, 2019

(65) Prior Publication Data
US 2019/0367135 A1   Dec. 5, 2019

Related U.S. Application Data

(63) Continuation of application No. 15/895,733, filed on Feb. 13, 2018, now Pat. No. 10,518,848, which is a
(Continued)

(51) Int. Cl.
*B63B 22/06* (2006.01)
*B63B 22/20* (2006.01)
(Continued)

(52) U.S. Cl.
CPC ............. *B63B 22/06* (2013.01); *A01K 61/54* (2017.01); *A01K 61/60* (2017.01); *A01K 61/75* (2017.01);
(Continued)

(58) Field of Classification Search
CPC ................................. B63B 22/06; B63B 22/20
See application file for complete search history.

(56) References Cited

U.S. PATENT DOCUMENTS

| 4,000,646 A | * | 1/1977 | Mott | ...................... B63B 39/14 |
| | | | | 73/170.31 |
| 4,202,036 A | * | 5/1980 | Bowditch | ............... B63B 22/20 |
| | | | | 114/326 |

(Continued)

FOREIGN PATENT DOCUMENTS

| DE | 4125407 A1 | 9/1992 |
| DE | 10108090 A1 | 9/2002 |

(Continued)

OTHER PUBLICATIONS

Office action for U.S. Appl. No. 151895,733, dated Mar. 5, 2019, Webb, "Smart Buoyancy Compensation Devices ", 6 pages.

(Continued)

*Primary Examiner* — Benjamin F Fiorello
(74) *Attorney, Agent, or Firm* — Lee & Hayes, P.C.

(57) ABSTRACT

Aquatic structures with adjustable buoyancy constructed in part with a vent valve for a buoyancy control device suitable for divers, where the vent valve may be opened by any combination of over-pressure, manual pressure relief or a powered means, where a force to a valve plug is applied by means of a spring that is constrained to prevent entirely lateral and angular movement but in which movement of the plug in the axis of the seat is unconstrained.

20 Claims, 20 Drawing Sheets

Related U.S. Application Data continuation-in-part of application No. 15/607,609, filed on May 29, 2017, now abandoned, which is a continuation-in-part of application No. 15/048,953, filed on Feb. 19, 2016, now Pat. No. 9,663,203, which is a continuation-in-part of application No. 14/059,496, filed on Oct. 22, 2013, now abandoned, and a continuation-in-part of application No. 13/432,063, filed on Mar. 28, 2012, now abandoned.

(60) Provisional application No. 62/458,532, filed on Feb. 13, 2017.

(51) Int. Cl.

| | | |
|---|---|---|
| *B63C 11/22* | (2006.01) | |
| *A01K 61/60* | (2017.01) | |
| *A01K 61/75* | (2017.01) | |
| *A01K 61/54* | (2017.01) | |
| *B63C 7/10* | (2006.01) | |
| *A01K 63/00* | (2017.01) | |
| *A01K 69/06* | (2006.01) | |

(52) U.S. Cl.
CPC .............. *A01K 63/00* (2013.01); *A01K 69/06* (2013.01); *B63B 22/20* (2013.01); *B63C 7/10* (2013.01); *B63C 11/2245* (2013.01)

(56) References Cited

U.S. PATENT DOCUMENTS

| | | | |
|---|---|---|---|
| 4,262,379 A * | 4/1981 | Jankiewicz | A01K 69/08 102/406 |
| 4,601,609 A | 7/1986 | Hyde | |
| 5,482,405 A | 1/1996 | Tolksdorf et al. | |
| 5,496,136 A | 3/1996 | Egan | |
| 5,509,369 A | 4/1996 | Ford et al. | |
| 5,560,738 A | 10/1996 | Noel | |
| 5,746,543 A | 5/1998 | Leonard | |
| 5,823,713 A | 10/1998 | Biran | |
| 5,845,235 A | 12/1998 | Luukkanen et al. | |
| 6,039,043 A | 3/2000 | Graber et al. | |
| 6,217,257 B1 | 4/2001 | Garofalo et al. | |
| 6,431,934 B2 | 8/2002 | Cressi | |
| 6,519,548 B1 | 2/2003 | Kuroda et al. | |
| 6,666,623 B1 | 12/2003 | Greene | |
| 6,722,819 B2 | 4/2004 | Godoy | |
| 6,745,069 B2 | 6/2004 | Nissila et al. | |
| 6,749,369 B2 | 6/2004 | Garofalo | |
| 6,772,705 B2 | 8/2004 | Leonard et al. | |
| 7,144,198 B2 | 12/2006 | Hirose et al. | |
| 7,383,150 B2 | 6/2008 | Angelini et al. | |
| 8,340,844 B2 | 12/2012 | Scoca et al. | |
| 9,663,203 B2 | 5/2017 | Sinclair | |
| 2002/0127062 A1 | 9/2002 | Biran et al. | |
| 2003/0056786 A1 | 3/2003 | Hollis | |
| 2003/0075096 A1 | 4/2003 | Leonard et al. | |
| 2005/0095067 A1 | 5/2005 | Hirose et al. | |
| 2006/0207516 A1 | 9/2006 | Tuerk | |
| 2008/0156327 A1 | 7/2008 | Hollis et al. | |
| 2010/0183373 A1 | 7/2010 | Stood et al. | |
| 2013/0255807 A1 | 10/2013 | Bonzon et al. | |

FOREIGN PATENT DOCUMENTS

| | | |
|---|---|---|
| GB | 798366 A | 7/1958 |
| GB | 2449949 A | 12/2008 |
| SE | 526907 C2 | 11/2005 |
| WO | WO2013144711 A1 | 10/2013 |

OTHER PUBLICATIONS

Office Action for U.S. Appl. No. 15/895,733, dated Dec. 4, 2018, Sinclair, "Smart Buoyancy Compensation Devices", 12 pages.

Office Action for U.S. Appl. No. 15/048,953, dated Aug. 17, 2016, Sinclair, "Buoyancy Vest Vent Valve With Reliable Seating", 11 pages.

Office Action for U.S. Appl. No. 16/539,886, dated May 14, 2020, Sinclair, "Smart Buoyancy Assistant", 8 pgs.

* cited by examiner

Control of Fishing Nets using
Smart Buoyancy Control Device (SBCD)

SBCD System in stormy weather

SMART BUOYANCY COMPENSATION DEVICES

CROSS REFERENCE TO RELATED APPLICATION

This application is a continuation of, and claims priority to, co-pending commonly assigned U.S. patent application Ser. No. 15/895,733, entitled "SMART BUOYANCY COMPENSATION DEVICES" and filed on Feb. 3, 2018, of which the entire contents are incorporated herein by reference. This The U.S. application Ser. No. 15/895,733 claims the benefit of U.S. Provisional Patent Application No. 62/458,532, filed on Feb. 13, 2017, and is incorporated herein by reference. The U.S. application Ser. No. 15/895,733 is also a continuation-in-part application of U.S. patent application Ser. No. 15/607,609, filed May 29, 2017, which is a continuation-in-part of U.S. Patent 9,663,203, filed Feb. 19, 2016, the content all of which is incorporated herein by reference. U.S. Pat. No. 9,663,203 is a continuation-in-part of U.S. Patent application No. 13/432,063, filed Mar. 28, 2012, now abandoned and U.S. Patent application No. 14/059,496, filed Oct. 22, 2013, now abandoned, the content all of which is incorporated herein by reference.

TECHNICAL FIELD

This description relates generally to aquatic structures and more specifically to utilizing buoyancy control to raise and lower the aquatic structure.

BACKGROUND

A buoyancy compensator, buoyancy control device, BC, BCD, stabilizer, or the like, is typically a piece of diving equipment with an inflatable bladder worn by divers to establish neutral buoyancy underwater and positive buoyancy on the surface, when desired. In a Buoyancy Compensation Device ("BCD"), the buoyancy is typically controlled by adjusting the volume of air in the bladder. The bladder is typically filled with gas from the diver's primary breathing gas cylinder via a hose from the regulator first stage, directly from a small cylinder dedicated to this purpose, or from the diver's mouth through the oral inflation valve. A means to add gas to a bladder in the BCD enables the diver's buoyancy to be increased, and vent valves allow gas to be discharged to reduce the diver's buoyancy through a reduction in the water volume displaced by the bladder.

Control of a diving buoyancy compensator is typically manual, and adjustment is required throughout a dive as the diver's weight reduces with gas consumption, and the buoyancy of the diving suit varies with depth as it compresses due to water pressure.

In aquatic applications, structures are often built to achieve various tasks. For example, in aquaculture or "fish farming", fish pens may be built and tethered in the open ocean to raise fish for market. Such aquaculture structures may be anchored in place and raised and lowered by mechanical equipment, such as wenches and the like. Buoyancy may be provided by floats and the like to keep the structures from sinking. Also such structures may also be constructed to raise shellfish, seaweed and the like that may be of commercial value. In the course of operation of such structures, it may be desirable from time to time to raise and lower them in the water.

In other aquatic applications structures may be employed to raise and lower, and otherwise recover objects from the sea floor. In such applications, winches and other mechanical methods may be utilized to bring the object to the surface. In such applications, such as ship recovery, a bag may be inserted in a ship's hold and inflated to displace the water and raise the ship. However, in the applications described above, little control over buoyancy is provided and the control when provided tends to require direct involvement by an operator or other personnel. Accordingly, it would be desirable to provide equipment and methods to control buoyancy in these applications that is capable of automatically and remotely controlling buoyancy to raise and lower such aquatic structures.

As can be seen from the paragraphs above, a buoyancy compensator can be a valuable piece of equipment during a dive as it allows a diver to adjust his or her buoyance in order to achieve positive, negative, or neutral buoyancy depending upon conditions sensed or programed into the buoyancy compensating device. There are other applications where it may be advantageous to construct structures or equipment for aquatic use in which the buoyancy of such structures may be controlled based on a desired set of conditions. In particular, buoyancy control that could be applied in such buoyancy controlled structures to raise and lower the structure its self in the water, raise and lower objects in the water that have been captured by the structure, or otherwise position the structure at varying depths in the water. It would be advantageous if a buoyancy compensator and its associated components could be used in such applications to adjust buoyancy for such structures. It would be of further advantage if such buoyancy compensators could be programmed and/or remotely controlled so that they operate autonomously and/or remotely.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides various aquatic structures that may utilize Smart Buoyancy Compensation Devices ("SBCD") that can utilize data analytics and artificial intelligence to automate buoyancy control for a wide range of aquatic applications. The exemplary SBCD system can be pre-programed and controlled remotely, which makes it amenable for use as a buoyancy control device to raise or lower various structures in the water.

More specifically, the present invention relates to devices, techniques, and methods to manage the buoyancy of various underwater devices and structures. A structure or application may utilize one or more smart buoyancy compensation devices to control the buoyancy of the structure and to raise or lower the structure in the water. In the smart buoyancy compensation device, gas is added to a bladder or equivalent structure via an electrically controlled gas valve, and vented by the simultaneous operation of at least one of a plurality of typically pneumatically activated vent valves. A control unit determines the period that the valves should be opened via a process utilizing inputs from at least one of a plurality of sensors typically measuring conditions such as depth, derivatives of the depth (the first derivate obtaining speed, and the second derivative the acceleration of the diver), and the like. The SBCD control units typically utilize a novel combination of sensors to obtain the ambient pressure, speed and acceleration of the structure within the accuracy and resolution limits of practical sensors and ADC converters or their equivalents.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Buoyancy bag alternative to rigid shell buoyancy control. Radio or ultrasonic controlled from surface boat with power from generators and compressor for air supplies. No surface buoys.

Figure 6:
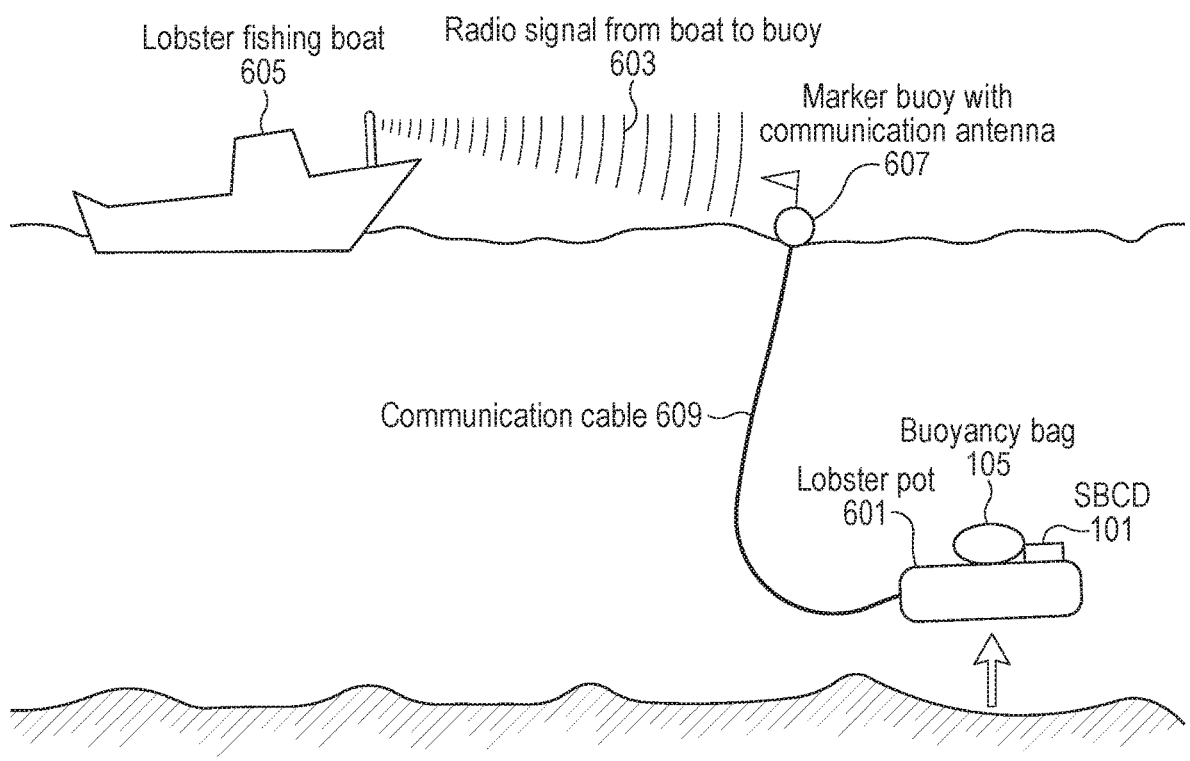

FIG. 6 shows a SBCD lobster pot retrieval system.

Figure 7:
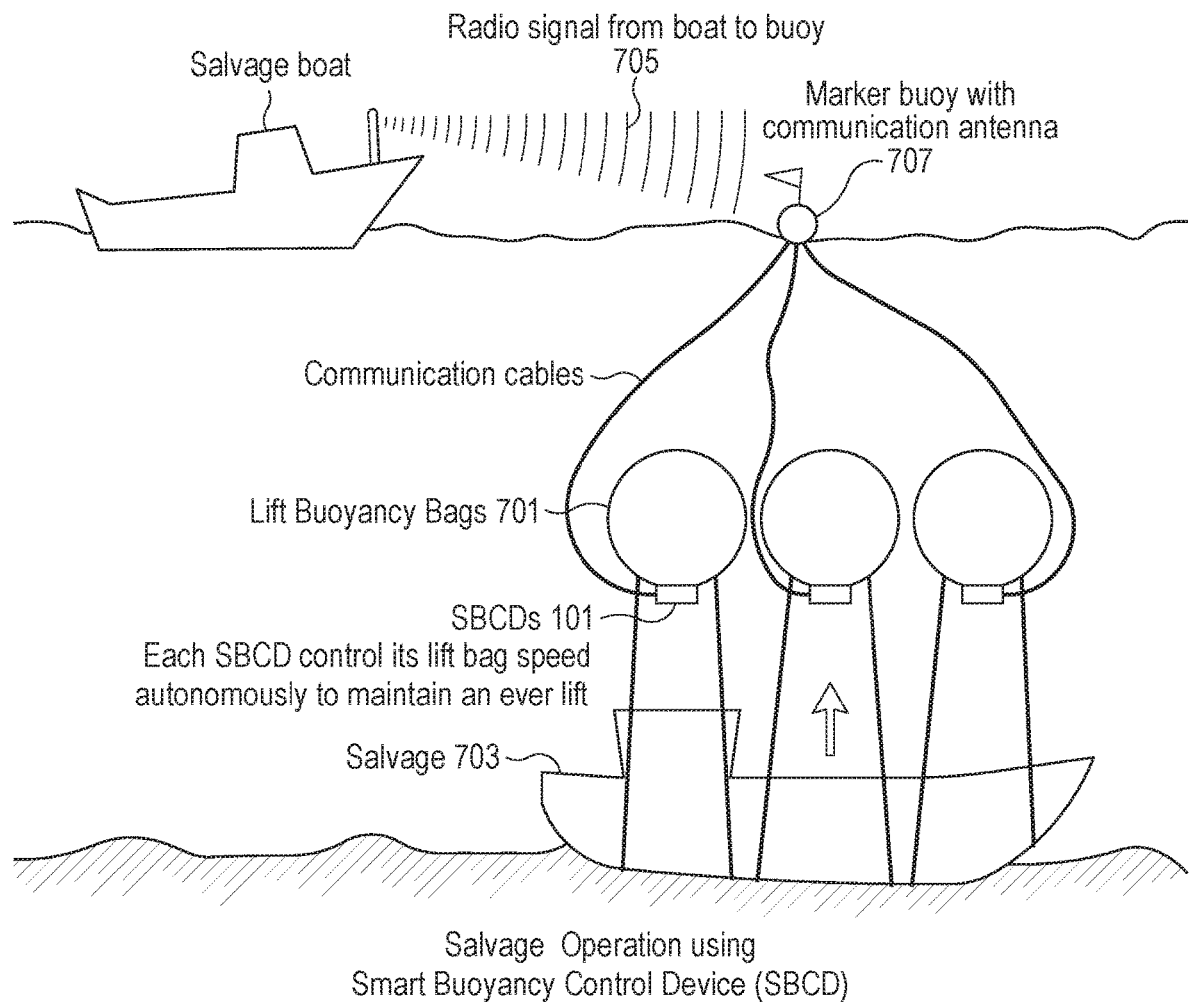

FIG. 7 shows a SBCD salvage operations system.

Figure 8:
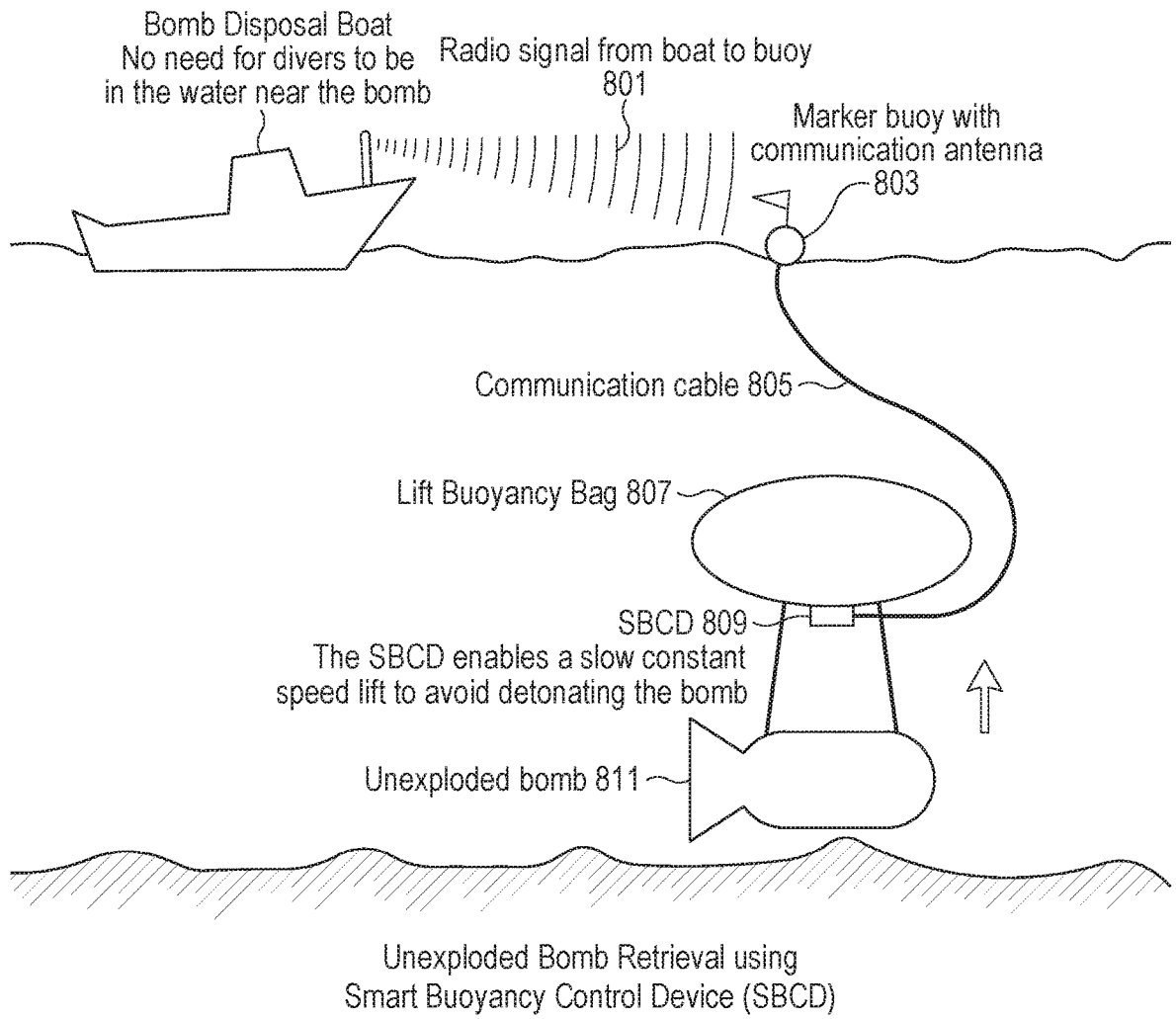

FIG. 8 shows a SBCD unexploded bomb removal system.

Figure 9:
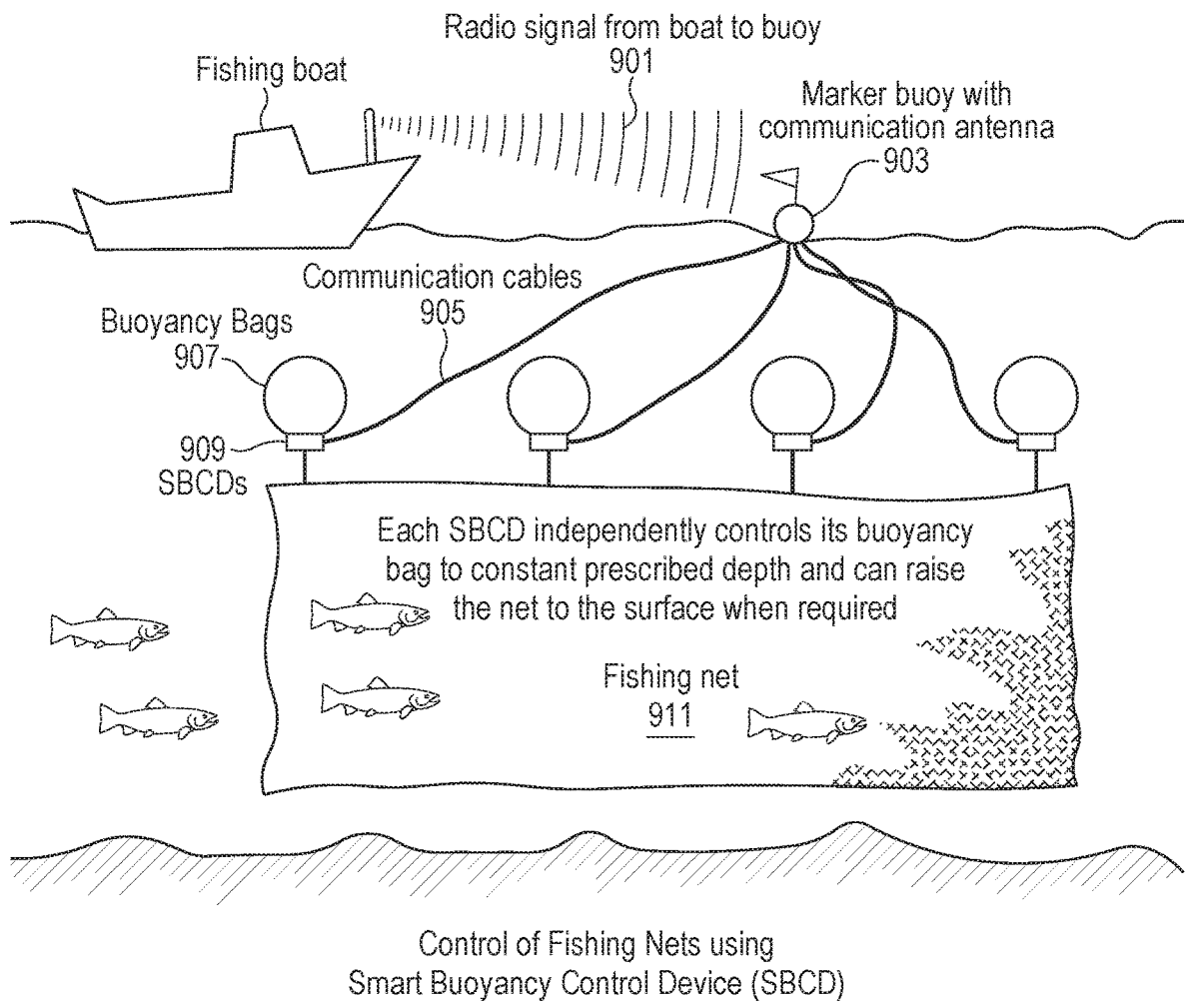

FIG. 9 shows a SBCD trawler, or hanging fishing net system.

Figure 10:
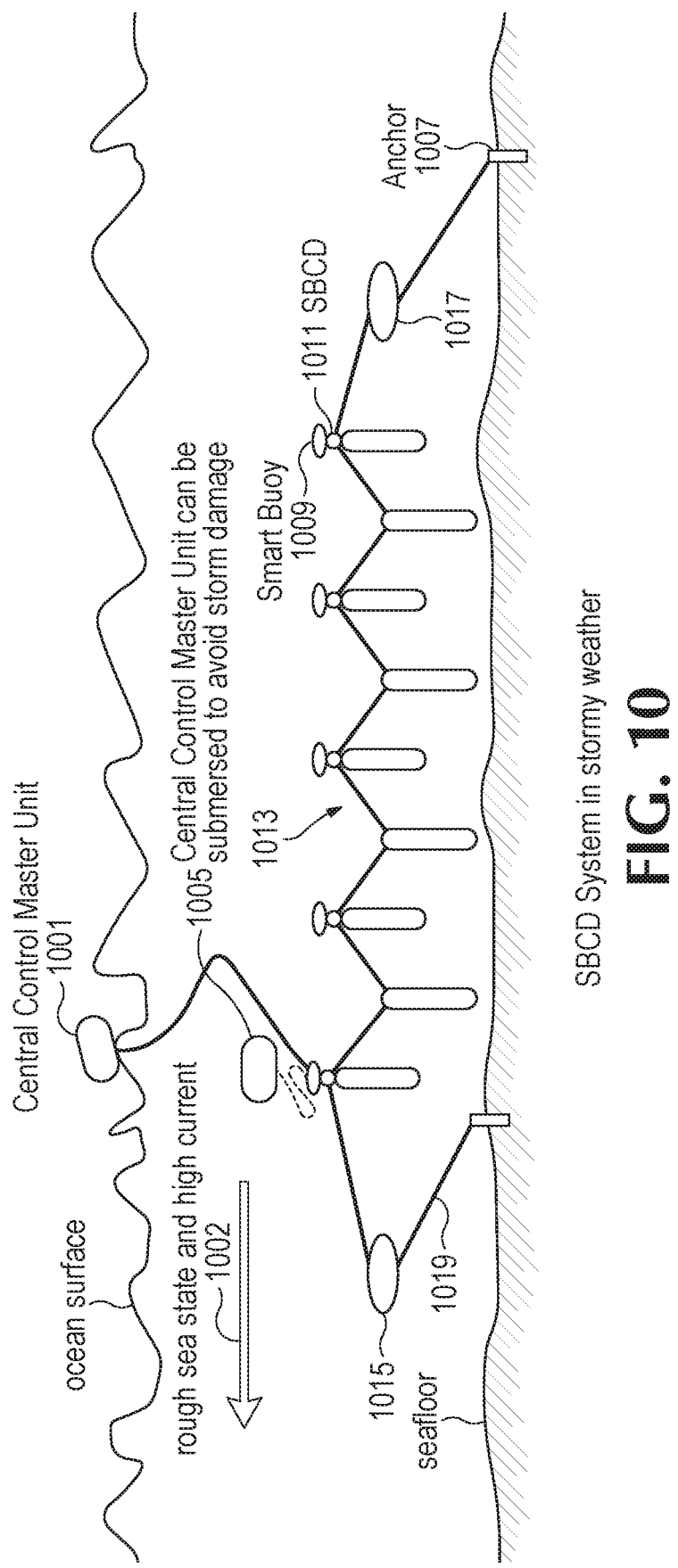

FIG. 10 shows a SBCD smart buoy aqua-forest.

Figure 11:
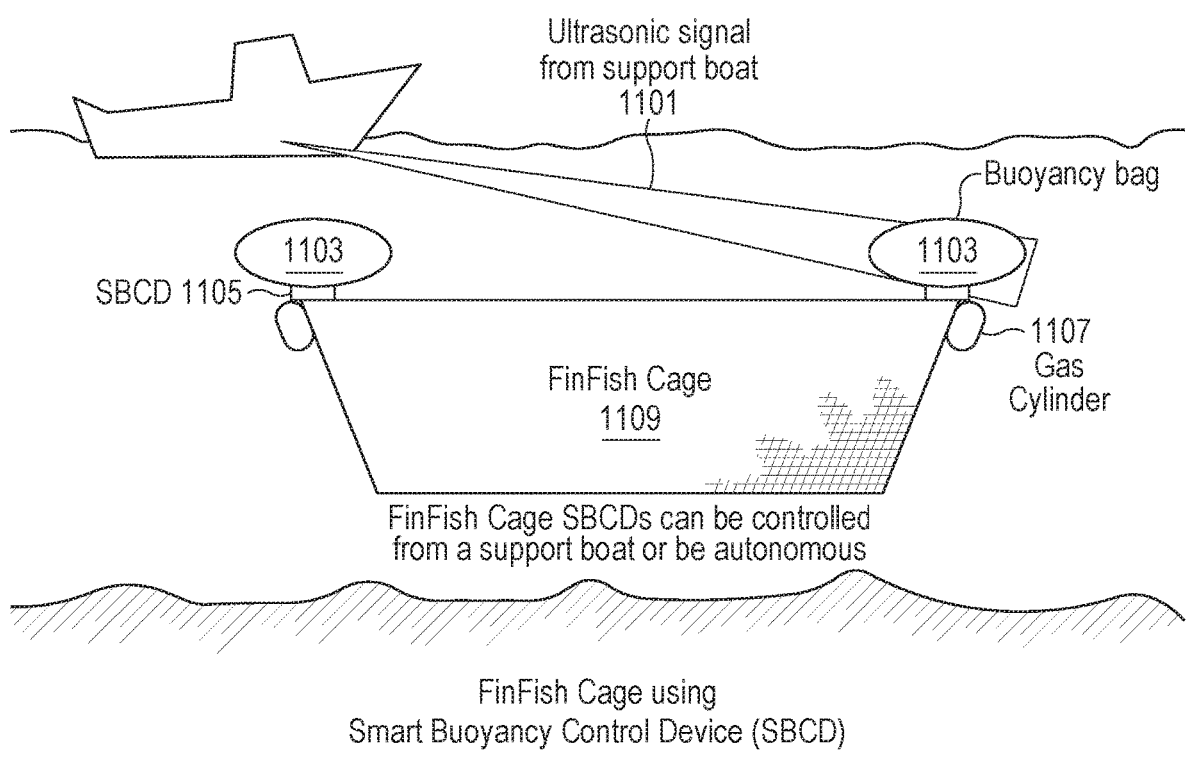

FIG. 11 shows a SBCD controlled fish pen system.

Figure 12:
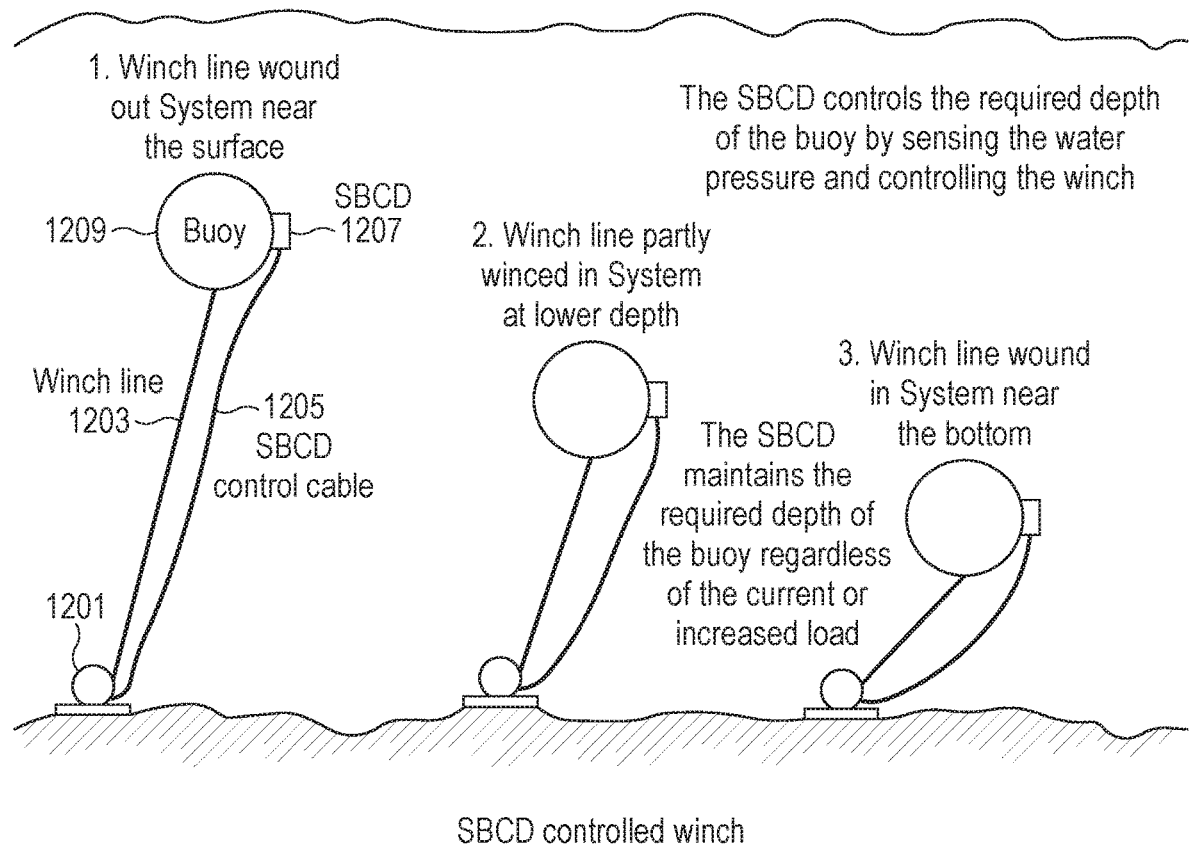

FIG. 12 shows a SBCD winch activated depth control system.

Figure 13:
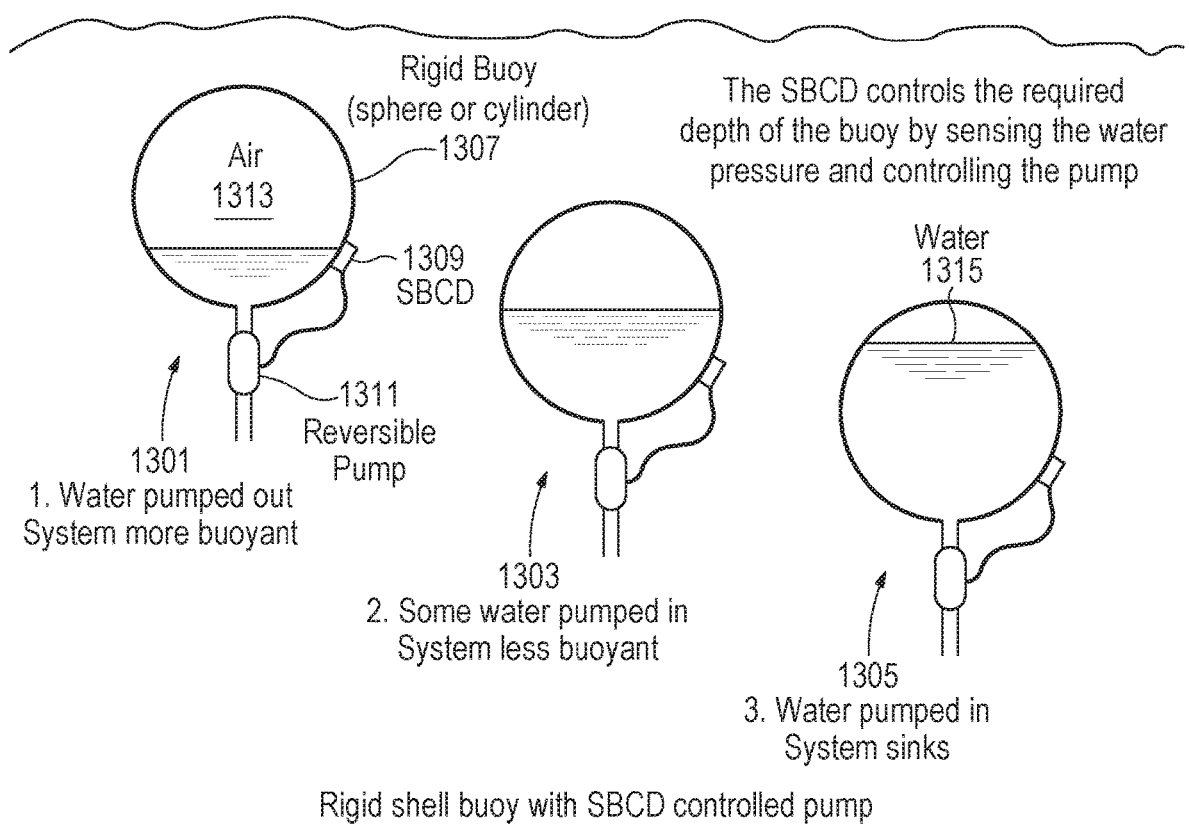

FIG. 13 shows a SBCD water pressure depth control system.

Figure 14:
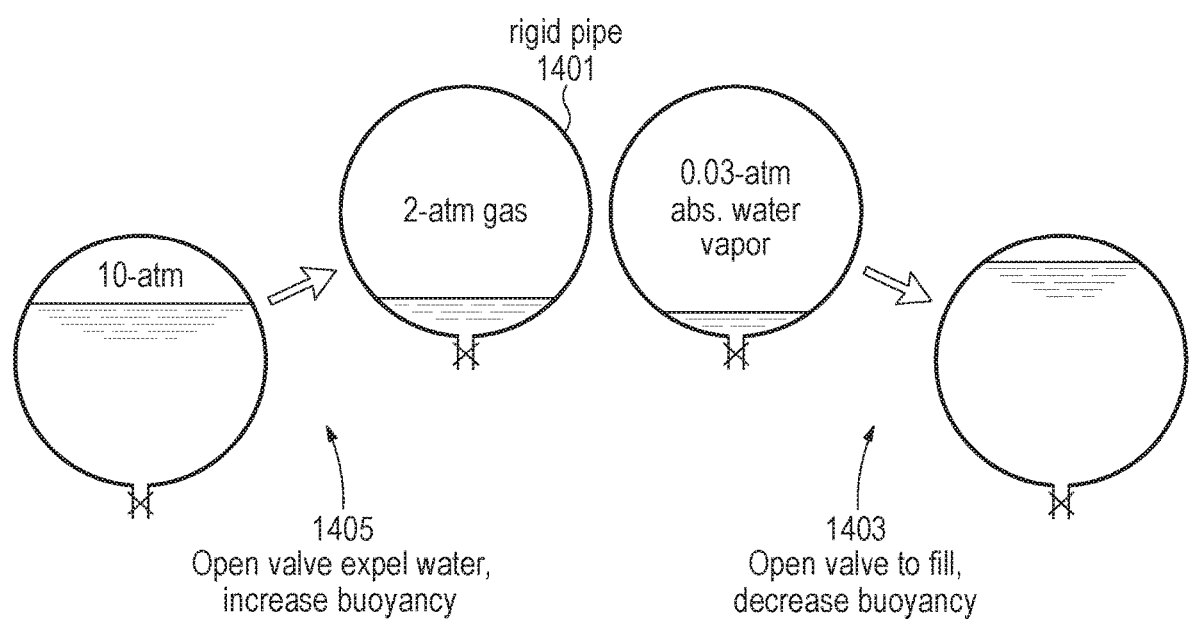

FIG. 14 shows cross sections of the hard shell pipe buoyancy adjusting buoy.

Figure 15:
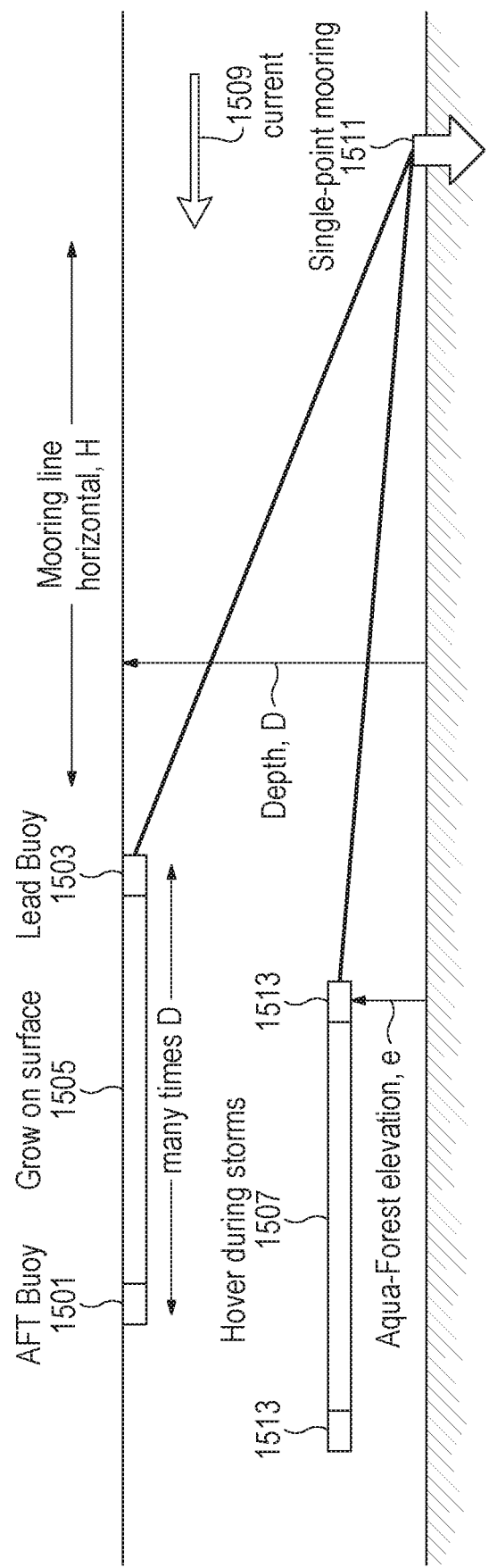

FIG. 15 shows a SBCD depth and buoyancy control system for non-parallel moorings.

Figure 16:
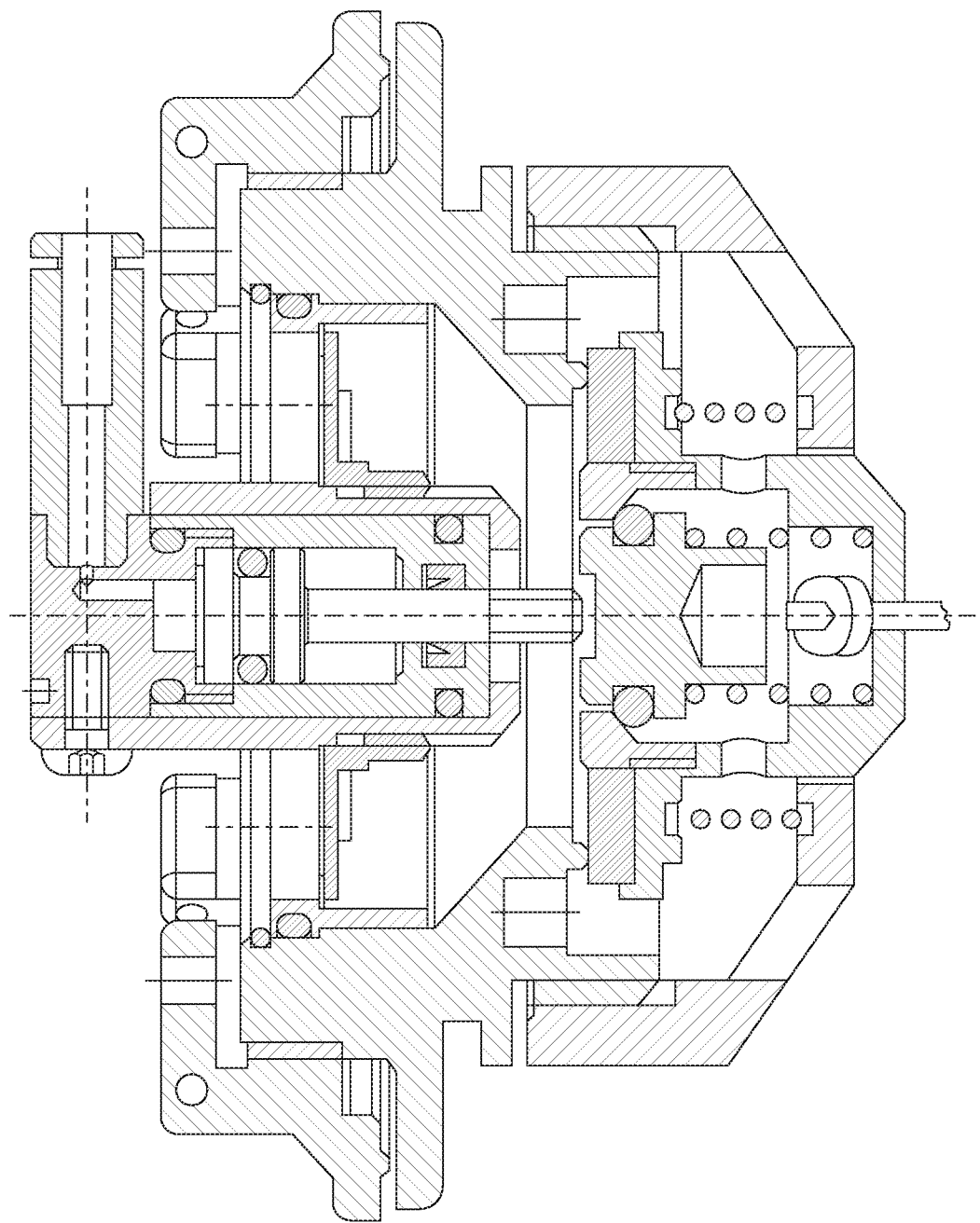

FIG. 16 shows a vent valve according to the present invention in the state where the valve is closed. The valve in this example and the following drawings includes provision for powered actuation, which is desirable but not a necessary feature of the valve.

Figure 17:
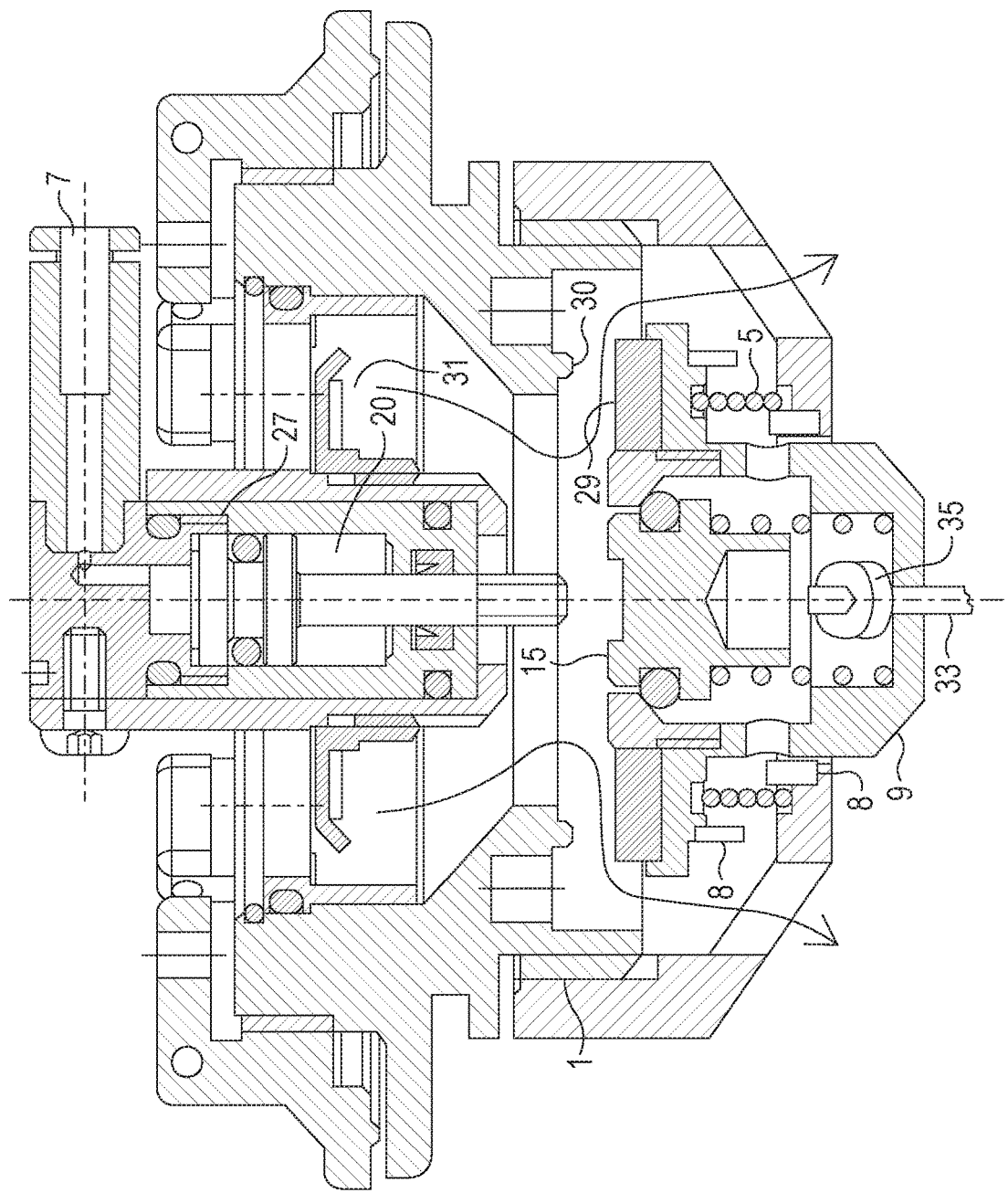

FIG. 17 shows a vent valve according to the present invention in the state where the valve is open through manual actuation or over-pressure.

Figure 18:
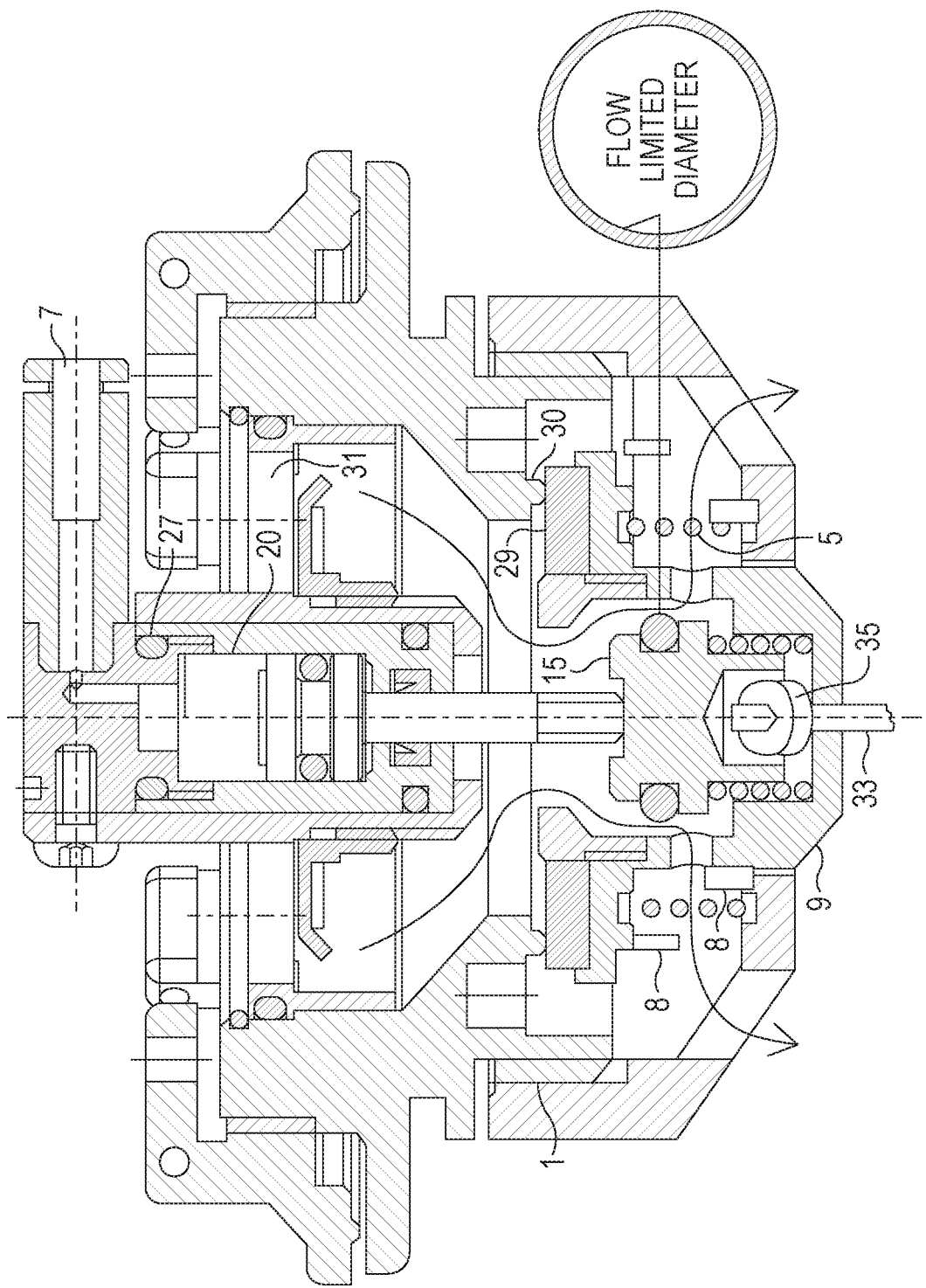

FIG. 18 shows a vent valve according to the present invention in the state where the valve is open through automatic actuation channel only.

Figure 19:
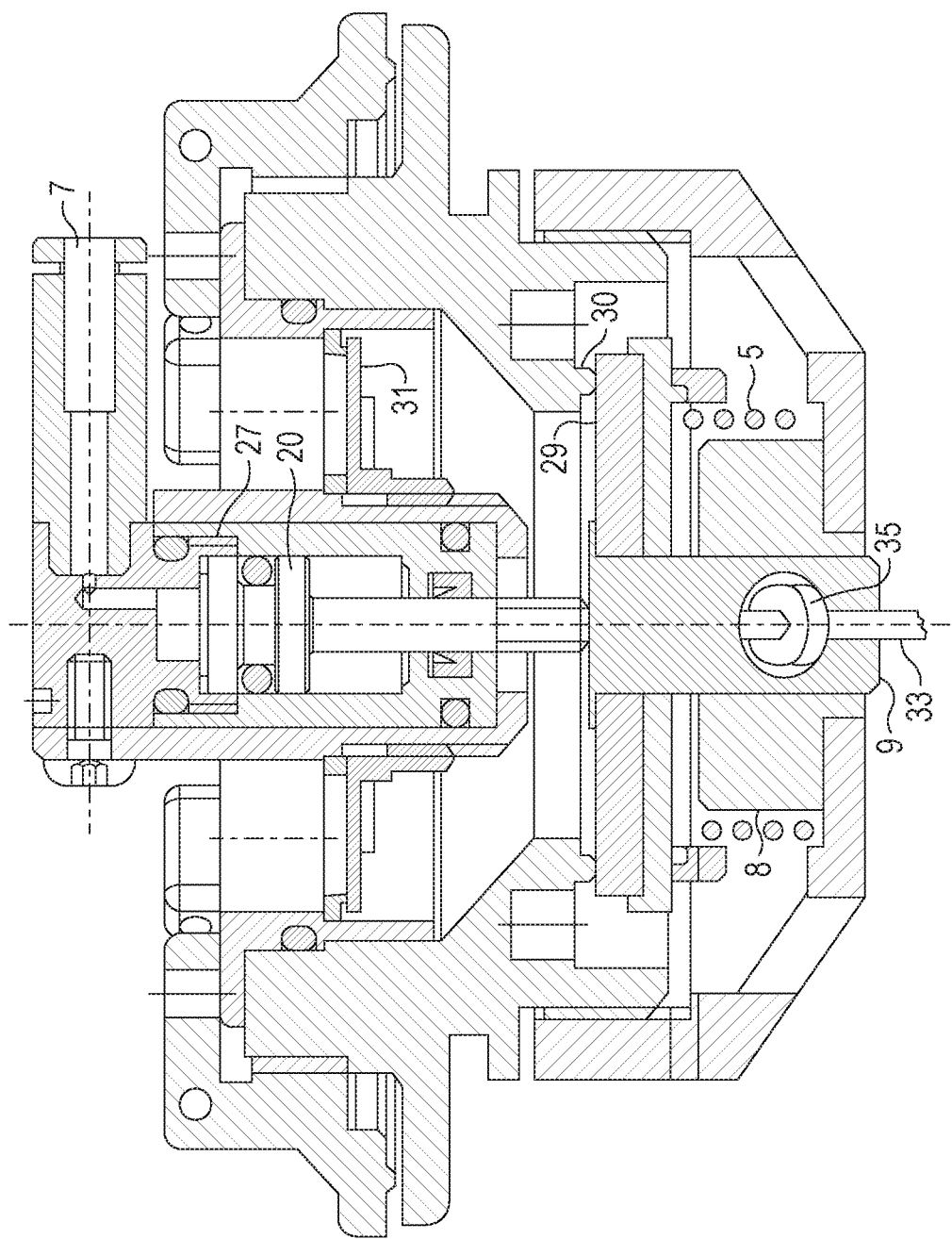

FIG. 19 shows a vent valve according to another embodiment of the present invention in the state where the valve is closed through automatic actuation channel only.

Figure 20:
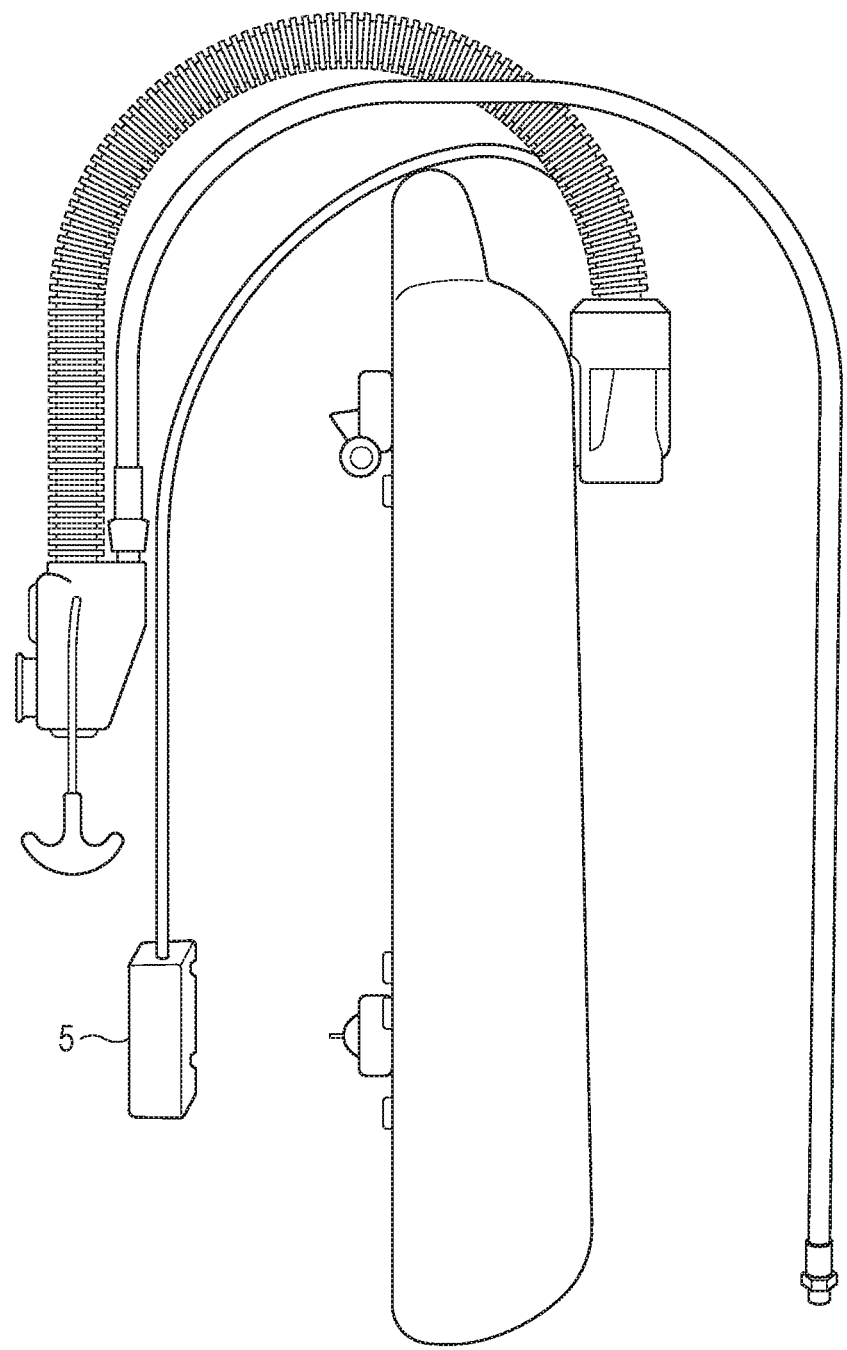

FIG. 20 shows an example of a SBCD diving vest.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a smart buoyancy compensation device for controlling buoyancy of an aquatic structure. Although the present examples are described and illustrated herein as being implemented in an aquaculture system, the system described is provided as an example and not a limitation. As those skilled in the art will appreciate, the present examples are suitable for application in a variety of different types of commercial diving, government/military, scientific and commercial fishing/aquaculture such as multi species aqua forests, fish pens, shellfish growing structures, biofuels production, seaweed growing structures, salvage systems and the like.

According to the particular application, SBCDs are utilized to maintain or move the relative position of farming structures to a depth sent to them by a master control unit. Such a system avoids any out of plain buckling by adjusting the individual buoyancies at the same speed regardless of different loads that may be applied to them.

Such systems advantageously allow a crop and structure that is typically protected from ocean surface pollution and any near surface parasites/impurities, storm, tidal race, surface shipping traffic and the like. Depth can be controlled on a time basis or in response to ambient conditions and nutrient cycle needs for a particular aquaculture crop. The SBCD systems may provide day light hours hold or return to near surface optimum position. Typical conditions the SBCD is capable of accommodating include an at sunset drop to 30 meters depth, when larger waves or shipping activity is detected then drop to 5 meters, and for harvesting a return to the surface.

The buoyancy controlled structures described herein are typically designed to autonomously lift/lower objects underwater without miles of expensive ropes/chains, cranes, diving crews, and the like.

The SBCD controlled systems described herein are important to the operation of low cost seaweed growing systems to maintain and change depth without either buoys or anchors. This capability means that free-floating structures can submerge to allow ship passage, avoid storms, access nutrients, or enter currents moving in a different direction than the surface current. The issue of efficient buoyancy control for underwater seaweed rigs and the like may be provided by the buoyancy control systems described below.

Figure 1:
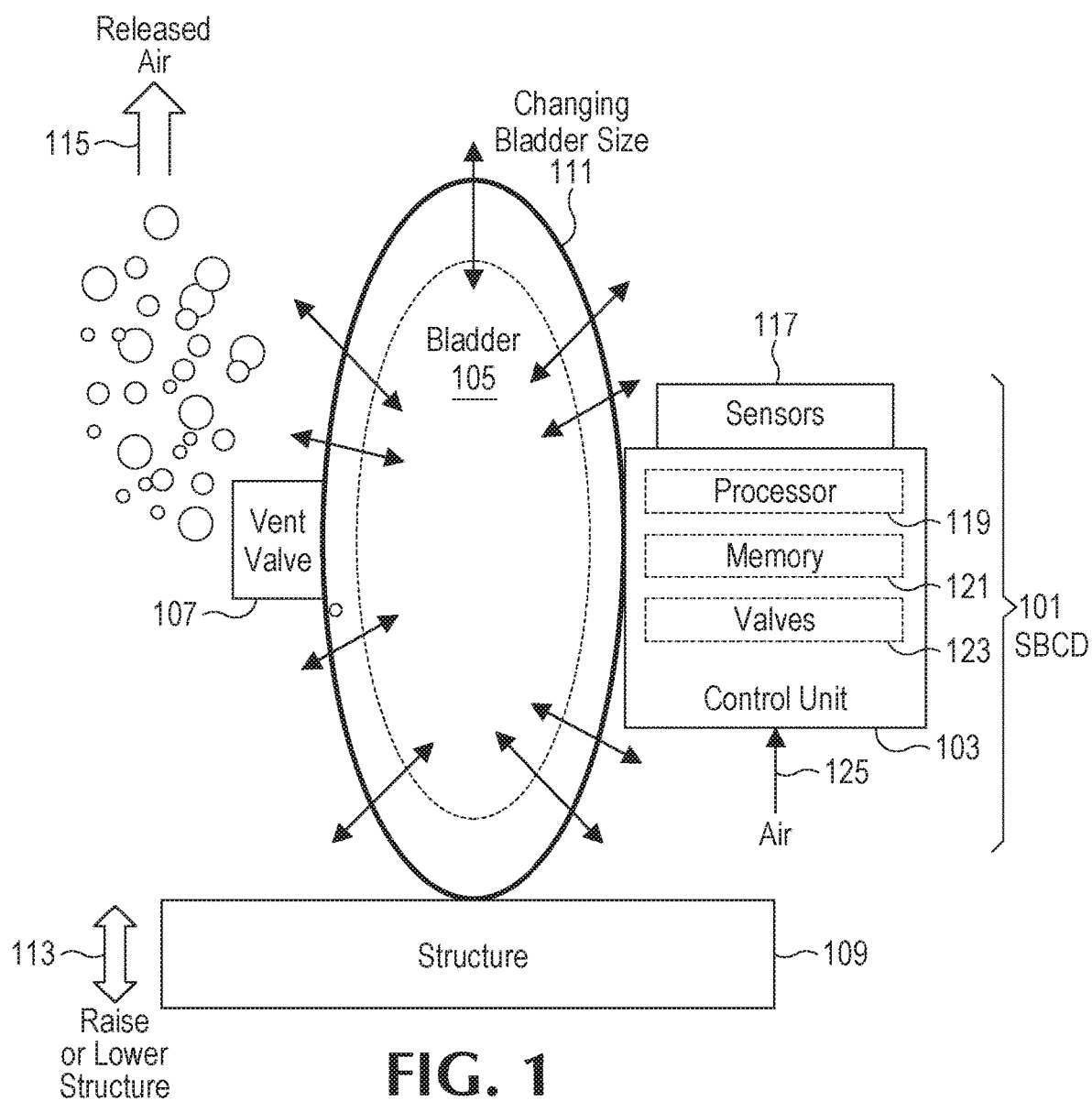
FIG. 1 is a block diagram showing an exemplary buoyancy control system for raising and lowering an aquatic structure.

FIG. 1 is a block diagram showing an exemplary buoyancy control system utilized for raising and lowering an aquatic structure 109. The SBCD 101 monitors and controls buoyancy. At least one of a plurality of SBCDs may be utilized in any given aquatic system to control buoyancy of an aquatic structure. In particular the SBCD has the ability to control the buoyancy of a structure changing its depth at any rate, or rates, and causing it to hover at a desired depth. Since an objective is typically to hover at a fixed elevation above the seafloor, precise autonomous (computer) control of the valves and pumps or a buoyancy bladder system is important to achieving autonomous, precise, and trouble free operation.

The SBCD controller 103 typically provides the following buoyancy control: (1) maximum depth, (2) maximum descent speed (typically pre-set), (3) maximum ascent speed (typically pre-set), (4) controlled ascent (at an exemplary 30 ft/min) with stops if desired, and if the computer calculates that they are required, (5) emergency ascent (at an exemplary controlled maximum speed of 60 ft/min), (6) level hold (maintains the structure depth, (7) automatic ascent to the surface when computer calculates from the buoyancy tank sender that the air remaining in the tank is at set level.

The SBCD 101 is an automatic buoyancy system that includes a control unit 103 having a processor 119 and memory 121 with software or firmware providing unique buoyancy control processes, valves 123 to convert signals from the processor to inflation and deflation actions. Also, part of the system are at least one of a plurality of sensors 117 coupled to at least one of the SBCD control units that provide information on ambient conditions (including depth, pressure, current, velocity, acceleration, or any parameter that may be needed as known to those skilled in the art to control buoyancy ascent, descent and the like). SBCD system power may be provided by batteries, an external solar panel or the like (not shown).

The processor 119 controls electro/pneumatic supply valves 123 which in turn control unique vent valves 107 (injection and exhaust valves). Commands to the various valves are typically either stored on the microprocessor or sent to it, or a combination of the two. Supply valves 123 are typically supplied air from a source 125 that can be a tank of compressed air, an external air-line, or the like.

The SBCD uses a processor (processor includes controller, PLLCs, microprocessors, or their equivalents) 103 linked to sensors on the object to be controlled to note conditions including water pressure and changes in water pressure to calculate the depth and speed of the device.

A bladder or buoyancy device 105 that may change volume 111, is provided for buoyancy.

At least one of a plurality of automated exhaust, or vent valves 107 is coupled to the bladder to release air 115 to decrease buoyancy. The vent valves 107 are in electrical and/or pneumatic communication with the control unit 103. Vent valves 107 such as described in "BOUYANCY VEST VENT VALVE WITH RELIABLE SEATING" U.S. Pat. No 9,663,203, issued Jun. 16, 2016, the disclosure of which is incorporated herein in its entirety, may be employed in the SBCD system.

The structure 109 may be any of the structures described herein, or equivalently any type of aquatic structure in which buoyancy is sought to be controlled.

In the case of a plurality of SBCDs they may be networked under a master controller (not shown) or may function independently if desired. SBCDs, as implemented for the systems described herein, typically include a plurality of communicating SBCDs to raise, lower, and hover 113 any size ocean structure or system, even with large waves passing overhead.

For example: (1) SBCDs may control the top of an exemplary raft seaweed-growing structure to hover an exemplary 1 meter+0.2 m, below the troughs of 2 meter high waves, (2) a wave motion/force sensor disposed on the top of a structure communicates to the SBCDs causing it to change hover depth in real time to optimize the sunlight available to seaweed and extend the life of the structure, reducing costs (During exemplary 1 meter high waves, the structure might be an exemplary 0.5 m below the troughs. During exemplary 10 meter storm waves, the structure might be positioned to an exemplary 15 meters below the troughs to reduce forces on the structures, seaweed, and anchors.), (3) SBCDs can maintain a certain depth on towed components such as a rope or ribbon moving to-from shearing in an exemplary harvest bag, or maintaining the top of an exemplary 20,000 ton full harvest bag net at an exemplary 25 meter depth while it is towed/winched a few hundred kilometers or so, by a transport vessel.

SBCD System Operation

Figure 5:
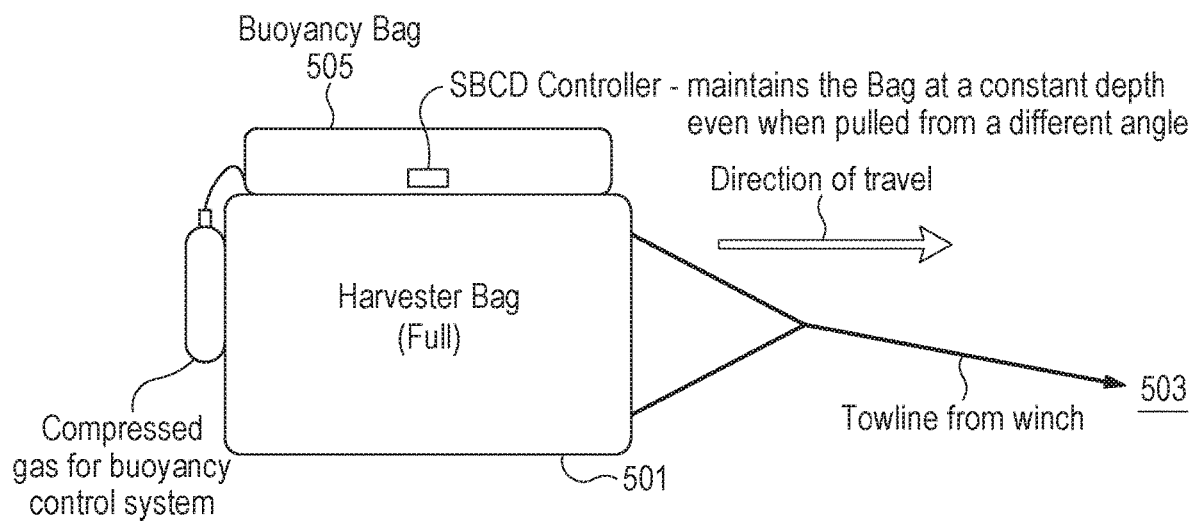
FIG. 5 shows a SBCD harvest bag recovery system.

The control unit (FIGS. 5-7 of U.S. Pat. No. 9,663,203, issued Jun. 16, 2016, the disclosure of which is incorporated herein in its entirety) typically operates as follows:

Inflation—When the processor decides that air should be added to the SBCD bladder, an electric pulse is sent to an inflation electro-pneumatic solenoid valve, which opens allowing low pressure air to enter the SBCD bladder via the inflation port. The computer decides the length of the pulse, and thus, the amount of air added to the bladder.

Deflation—When the processor decides that air should be removed from the BSCD bladder, an electric pulse is sent to a deflation electro-pneumatic solenoid, which opens allowing low-pressure air to enter a small cylinder. The piston in this cylinder is connected to a deflation vent valve. When this deflation vent valve opens it allows air in the SBCD bladder to escape via a port in the controller. The computer decides the length of the pulse, and thus, the amount of air added to the bladder.

Artificial Intelligence—The SBCD system is designed to emulate a variety of conditions for operation of the structure.

In a typical system when air is added or removed from the bladder, a longer pulse is sent (rather than a series of short pulses). Then, after a predetermined time a correction may be made if determined to be needed. Pulse length is typically dependent upon a measured deviation from a desired speed or depth. In addition, small changes in buoyancy may be filtered out if desired.

Figure 2:
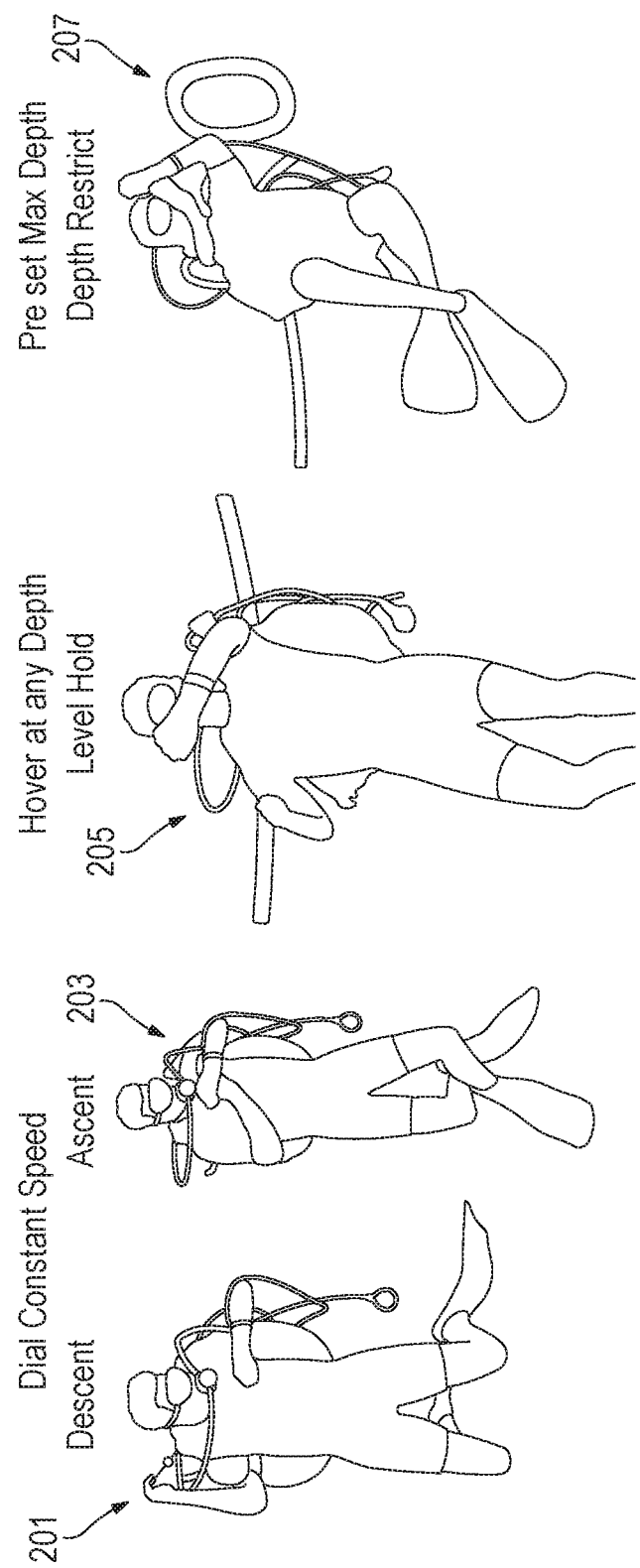
FIG. 2 is a diagram illustrating the abilities of a smart buoyancy compensation device utilized in diving that provides automated hands free controlled descent, depth limit, hover, and controlled ascent.

FIG. 2 is a diagram illustrating the abilities of a smart buoyancy compensation device utilized in diving that provides automated hands free controlled descent 201, depth limit 207, hover 205, and controlled ascent 203. The diving SBCD allows a diver to change depth at any rate and hover at any desired depth. SBCDs are used in scuba diving equipment to enable the diver to have hands free controlled descent, depth limit, hover, and controlled ascent.

A description of a diving buoyancy control device suitable for modification as known to those skilled in the art to achieve the functions described herein is further described in "BOUYANCY VEST VENT VALVE WITH RELIABLE SEATING" U.S. patent application Ser. No. 15/607,609, filed May 29, 2017, the disclosure of which is included in its entirety by reference.

SBCD commands utilized from such a diving system can include: (1) Stay at the depth commanded, (2) Descend to a new depth at a controlled speed, and (3) Rise to a new depth at a controlled speed. The controller then sends signals to the valves to adjust the buoyancy in the bag by releasing or adding compressed gas from or to the buoyancy bag, typically incorporated into a diver's vest.

In such a system advantageously utilized in a SBCD, the depth and speed of the device, and thus the system, are monitored around 10 times a second and adjustments made until the commanded conditions are met. A system of artificial intelligence is used to make human style adjustments rather than many small adjustments. This tends to save compressed gas and power.

Figure 3:
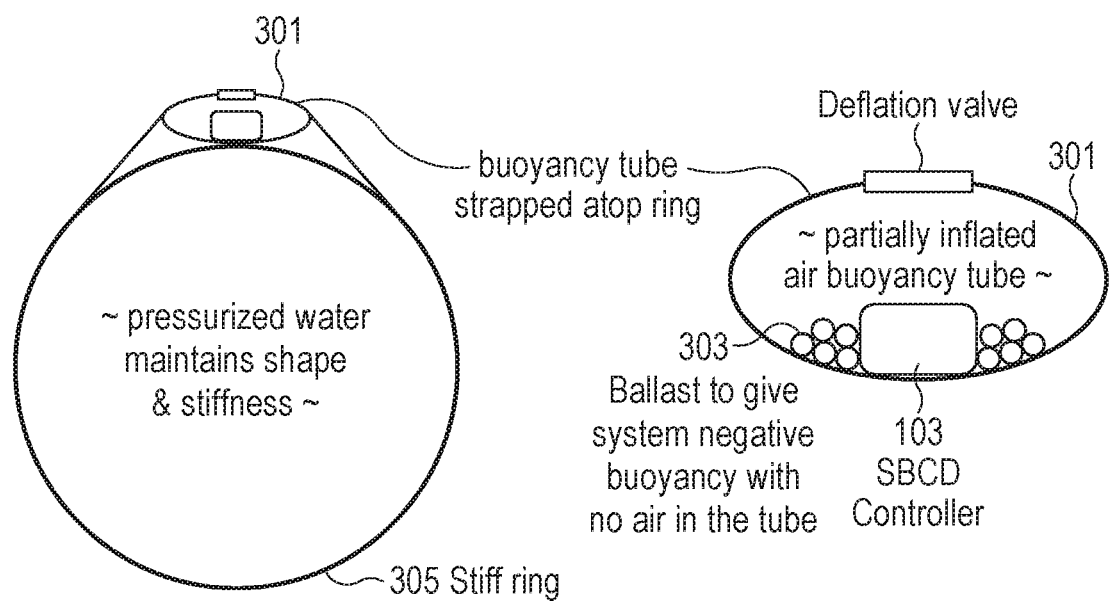
FIG. 3 shows the SBCD buoyancy tube structure as utilized in aquaculture applications.

FIG. 3 shows the SBCD buoyancy tube structure 301 as utilized in aquaculture applications. For aquaculture applications, SBCDs typically use a buoyancy tube, that may be partially inflated to hover at selected depth. Near the surface the tube is inflated and is almost completely deflated at depth. The air in the tube combined with the ballast (rocks, or the like) 303 keeps the overall structure neutrally buoyant. The tube may also house the SBCD controller 103.

The fundamental principle of the SBCD is that it inflates or deflates a buoyancy control unit which can be a buoyance bag, or bladder structure (for example 105 of FIG. 1), or rigid buoy that is inflated by a gas or other gas. The bladder may also be equivalently replaced by a rigid structure 305, such as a spherically shaped object. By removing, typically by pumping, or the like.

Figure 4:
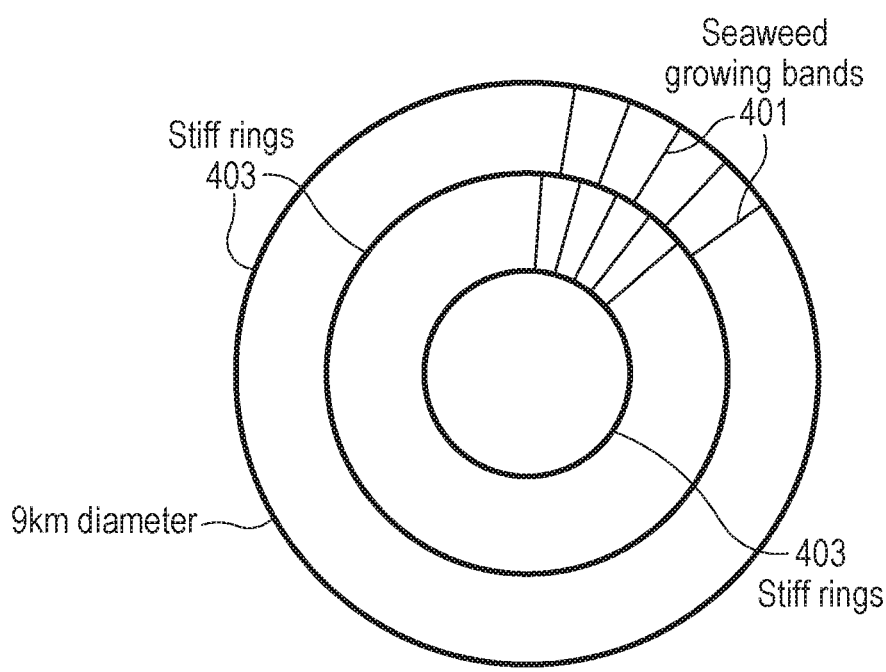
FIG. 4 shows a top view of an SBCD controlled aquatic structure having sections of adjustable depth rings from which seaweed may hang as it grows (seaweed farming).

FIG. 4 shows a top view of an SBCD controlled aquatic structure having sections of adjustable depth rings 403 from which seaweed may hang on bands 401 as it grows (seaweed farming). In this application, the SBCDs operate to control the structure having more inertia and hovering closer to the water surface. The structure shown can change depth at any rate and hover at any desired depth as controlled by a SBCD. For aquaculture, the SBCD's may use the above described buoyancy tube, that is partially inflated to hover at a selected depth.

The SBCD will slowly adjust the depth over months as sea life (seaweed, crustaceans, etc.) grow and change the net buoyancy of the structure, or over minutes should any forces try to move the system from its set depth.

The SBCD senses its depth for an exemplary 10 times a second, and can add and release air to and from the buoyancy tube in tenths of a second increments.

Without this precise control, minor depth excursions, even the changing pressure of waves above the structure, would cause changes in its depth. By deflating the tube, the structure can be taken to an exemplary set depth (up to 1000 m) at a controlled speed.

To ascend, the SBCD may add air to the bag. If left unadjusted, the system would rise at an uncontrollable increasing speed because of the expansion of the tube, but the SBCD releases air to control the ascent speed to a pre-set maximum rate.

In particular, for seaweed farming buoyancy tubes are attached to sections of the farming system. The farming system is formed from a series of concentric rings of tubes, the largest being up to 9 km diameter. Seaweed grows on bands hanging from radial lines hanging from the rings. In an exemplary application, over 50,000 buoyancy tubes and associated control systems may be required per farming system. Each buoyancy tube has an exhaust valve(s), computer and controller coupled to it. Each computer is linked to a central control which issues prescribed depth commands. And finally, each computer is autonomous in taking its tube to the required depth and maintaining that depth.

This application also utilizes communication between land/control platform and the SBCDs; between SBCDs; and between remote sensors and SBCDs. A pressure/depth sensor (not shown) hanging an exemplary 10 meters below the structure may be utilized to avoid SBCDs depth "hunting" due to waves.

FIG. 5 shows a SBCD harvest bag recovery system. Once cut from the seaweed farm, the seaweed is transported to a processing station in a bag 501 containing up to an exemplary 20,000 tons of seaweed. The bag is typically towed 503 under water. In this example, an automatic buoyancy system 505 is coupled to the bag to maintain a prescribed depth regardless of the angle of tow, which tends to avoid having the bag colliding with the farming system or shipping.

FIG. 6 shows a SBCD lobster pot retrieval system. This system includes a SBCD 101 attached to lobster pot traps 601 so they can be easily retrieved. The SBCD-controlled lobster trap can be signaled 603 by the boat 605 to ascend at less than an exemplary 0.1 m/sec to the surface for collection by a boat 605.

In this example, an automatic buoyancy system is attached to a lobster pot. An antenna buoy 607 on the surface is connected to the buoyancy controller 101 on the pot 601 with an antenna cable 609. The lobster fisherman sends a signal to the pot as he approaches the vicinity of the buoy, thus, speeding up the retrieval time as no winching from the seabed is needed. The pot rises at a controlled rate and is picked up by the boat. When re-baited the pot is returned to the sea bed at a controlled speed using the SBCD system.

FIG. 7 shows a SBCD salvage operations system. In this application automatic buoyancy systems with large bags 701 are attached to the object (ship, plane, etc.) 703. A signal 705 to inflate the bags can be given from a central point to at least one of a plurality of BCDs 706 via a radio signal 705. This signal can be made by wire, radio, or ultrasonic means, but is typically communicated via wire. The signal is typically picked up by a buoy with a receiving antenna 707, that transfers the signal to the SBCDs via a cable. Each controller autonomously inflates and deflates its bag 701 to maintain a predefined ascent speed. In the case of ancient relics, a very slow ascent rate is typically necessary to avoid damage to the object 703. The SBCD system uniquely enables this speed to be maintained.

FIG. 8 shows a SBCD unexploded bomb removal system. In this system application utilizing an SBCD, an automatic buoyancy system 809 (including a buoyancy bag 807) or systems is attached to the bomb 811. Signals can be sent to the controllers 809 by wire, radio, or ultrasonic transmission 801 to give adjustment commands to a buoy 803 with a receiving antenna and in communication with the SBCD via a cable 805. Each controller then maintains its prescribed speed or depth autonomously. A slow ascent is maintained avoiding detonation of the bomb. On conventional bomb retrievals, divers are typically required in the water to control the speed. There is no need for manned operations with the above described system.

FIG. 9 shows a SBCD trawler, or hanging fishing net system. This system is used to control the depth of trawled or hanging fishing nets 911. A plurality of automatic buoyancy systems 907, 909 are attached to fishing nets. The nets are then controlled to prescribed depth by each system independently. The systems can be adjusted by the fishermen by signals 901 sent to the controllers by wire, radio, or ultrasonic means, received by an antenna buoy 903 and transmitted to the SBCDs via a cable or cables 905. The nets can be raised to the surface on a radio command from the fishing boat.

FIG. 10 shows a SBCD smart buoy aqua-forest. In this system a retractable central control master unit 1001 is deployed to the surface to monitor roughness of the seas and detect high currents 1002. The master unit may also be withdrawn, or retracted 1005. It is coupled to a plurality of SBCDs 1011 with corresponding buoyancy devices 1009, each coupled to a corresponding aqua forest structure 1013. Each aqua forest unit is strung 1013 together in series with each end tethered to a seafloor anchor 1007. SBCDs may also be disposed in each anchor cable end 1015, 1007. In alternative examples, individual aqua forests may be arranged in alternative structures such as grids and the like.

Aqua-forestry generally refers to an artificial eco system analogous to that of a kelp forest. However, in an aqua-forest, any type of seaweed may be utilized in conjunction with desired fish and shellfish species, including combinations of penned finfish, shellfish, seaweed, free range fish, and crustaceans. Shellfish grown around fish pens tend to remove both sea lice and fish feces. The aqua-forest approach to aquaculture may also decrease the cost of finfish aquaculture.

FIG. 11 shows a SBCD controlled fish pen system. SBCDs automatically add or remove air buoyancy to maintain desired structure buoyancy. The system may be radio or ultrasonic controlled 1101 from a surface boat or shore station. Advantageously there are a reduced number of, or no surface buoys needed. Also, there is no need for expensive anchors and/or moorings requiring regular maintenance and repair. A cage structure 1109 is provided to contain the fish, and it is fitted with SBCDs 1105 including buoyancy structures 1103 and optionally gas cylinders 1107 for systems injecting gas to control buoyancy.

In alternative examples, aqua-forestry can be constructed in trampoline-like layers in the pen structure. The layers allow, finfish, shellfish, and seaweed all share the same area in substantially vertical layers or arrangement. The shellfish and seaweed might be denser than when they are farmed separately from finfish due to the improved nutrient recycling and/or nutrient remediation by substantially collocating the species to form an artificial forest. The finfish may cost-effectively enjoy more productivity per area with less finfish density per water volume. The finfish's lower volume density should help reduce the spread of disease and pathogens.

FIG. 12 shows a SBCD winch activated depth control system. This SBCD controlled winch system may be used in conjunction with the previous examples to replace the previously described buoyancy chambers in which buoyancy is controlled by adjusting air volume of pumping water in a rigid vessel and compressing the air contained in it. Here, a buoy 1209 of fixed positive buoyancy is tethered to the winch via a cable 1203, and it is simply raised and lowered (along with any structure coupled to it) under control of the SBCD 1207 attached to the buoy (and coupled to the winch via a control cable 1205) by a winch 1201 located on the sea floor. This system may be wire, radio, or ultrasonic controlled from a surface boat or shore station (not shown). By using a sea floor anchored system surface buoys are reduced or eliminated.

FIG. 13 shows a SBCD water pressure depth control system. As previously mentioned in the above paragraphs, water pressure may be used in a rigid vessel 1307 containing a compressible gas 1313 rather than a bladder to provide a variable buoyancy device. Rigid partially water-filled spheres, pipes, or the like may use electric pumps 1311 to remove or add water 1315 to change buoyancy. As in previous examples, radio or ultrasonic control from a surface boat with power from generators or solar panels may be utilized. The system may be further simplified by utilizing workboat mounted pumps to pump water (or alternatively compress air or pump a vacuum).

Under SBCD 1309 control, a reversible pump 1311 attached to a rigid vessel 1307 that is partially filled with air either fills the vessel with water 1305, compressing and reducing the air volume, or removes water increasing the air volume 1301 making the structure more buoyant. Also, a neutral buoyance state may be obtained 1303 by adjusting the proportions of water and air.

FIG. 14 shows cross sections of the hard shell pipe buoyancy adjusting buoy. Whether utilizing bladders or rigid buoyancy devices 1401, the SBCD systems can effectively adjust the buoyancy of collapsing (balloon-like) or hard-shell gas containers of this figure so that: a submerged structure can hover a few feet below wave troughs at a constant distance from the sea floor with a tropical storm passing overhead, and submerged structures can be made to move up or down or hover at constant depth even with changing current.

The physical buoyancy adjustment is made by adding 1403 or removing 1404 water (using compressing air, or pumping water in or out) inside rigid cylinders 1401 or spheres. The cylinders can be as simple as HDPE-coated corrugated steel storm drain pipe with crush depth near the maximum expected. The figure shows two ways to compress or pull a vacuum in the pipe sections. In the Aqua-Forestry context, most pumping is done slowly when the structure is near the ocean surface. The buoyancy only changes by opening the valve moving water. The rigid structure means buoyancy does not change with changing depth. For months at a time, the structure is on the surface with slowly increasing air volume to balance increasing biomass (shellfish, barnacles).

Regarding the pressures, shown in the left side of the figure shows a version where a workboat-mounted pump "charges" the cylinders with air or vacuum while harvesting the heavy crop (shellfish). This simplified arrangement is appropriate for current shellfish farming. The right side of the figure represents systems conditions with distributed pumps and solar power panels mounted on the structure.

In general, pumping water is much more energy efficient than is compressing air. Submersible pumps are off the shelf and commonly available. The amount of energy storage will be determined by what is needed to create overall positive buoyancy when returning from maximum submergence depth. A moored Aqua-Forestry system might only need to match the shellfish-paced change of buoyancy. The current might push moored Aqua-Forests to the seafloor. Conversely, reduction of current allows moored Aqua-Forests to pop up. With unmoored Aqua-Forests, a little stored energy may be needed to switch from neutral to positive buoyancy at max depth. Max depth and rate of depth change is limited by the sea-life's sensitivities. The obvious stored energy could be gas pressure in containers, a central cache of high-pressure air, or batteries for the pumps.

FIG. 15 shows an SBCD depth and buoyancy control system with non parallel moorings. Existing structures farming sea vegetables (aka seaweed), shellfish, or penned finfish (sometimes combinations) often employ trapezoidal and single point moorings 1511. Without depth and buoyancy control, the lead buoy size and the mooring line horizontal length are typically established by the maximum surface current and wave height. This is because the aft buoy 1501 will remain on the surface, exposing the entire structure to the maximum waves even should the lead buoy 1503 be pushed deep below the surface by the strong current 1509 associated with powerful storms.

The lead buoy may advantageously incorporate SBCD depth and buoyancy control 1513. In contrast, an Aqua-Forestry system equipped with a SBCD control system sinks 1507 intermediate and aft buoys as the current, or the wave height increase beyond a sub-maximum set limit. The control over intermediate and aft buoy sinking is such that they may hover 1507 at the same elevation as the lead buoy, and would return to the surface with the lead buoy. For example, if the structure grows sea vegetable adequately when it remains on the surface 1505 for 90% of the daylight time, the components are all designed for two situations: (1) surface current and waves that are smaller than the design situation 90% of the time; and (2) hover-depth/elevation current and wave water particle velocities that occur during the extreme event at the hover depth. (Water particle velocities will be less than 10% of the surface, current will generally be slightly less than the surface current. The current direction can change more than 180° as a tropical storm passes overhead.)

Vent Valve

In the following paragraphs reference is made to a BCD bladder. The form of the bladder is not important; the present invention many be applied to many different types of bladders. The sole special requirement for the bladder to be used with the present invention is that the vent valves shall be arranged such that there is an open gas path from the gas in the bladder to one of the vents. At least one vent valve is required to fulfil this requirement depending on the range of diver attitudes for which the vent function is available.

FIG. 16 shows a vent valve according to the present invention in the state where the valve is closed. The valve in this example and the following drawings includes provision for powered actuation, which is desirable but not a necessary feature of the valve.

FIG. 17 shows a vent valve according to the present invention in the state where the valve is open through manual actuation or over-pressure.

FIG. 18 shows a vent valve according to the present invention in the state where the valve is open through automatic actuation channel only.

FIG. 19 shows a vent valve according to another embodiment of the present invention in the state where the valve is closed through automatic actuation channel only.

The vent valves in example embodiments shown in FIGS. 16-19 have a conventional manual pull dump 33 in addition to a pneumatically or hydraulically powered piston 27. The pull dump may be on a cord 35 or a lever. A spring 5 applies a pressure to a valve plug 29 to close a seat 30), but which can be overridden by any combination of manual pull action, over-pressure or in these embodiments the powered actuation of the piston. The vent valve shown in FIG. 16 also comprises an inner valve plug 15; however, the vent valve according to another embodiment shown in FIG. 4 comprises only one main valve plug 29.

A compression spring 5 is constrained by walls 8 for more than half its length, which prevents entirely the spring moving laterally side to side in the drawings. The walls 8 can be arranged from opposite sides of the spring 5 or the walls 8 can have another configuration. The compression spring 5 may be a wire spring or a wave spring, or any other type of spring that applies a force to the valve plug 29 towards the direction of the seat 30.

A compression spring 5 will apply an uneven force to the plug 29. Without further constraint, this would tend to allow the plug 29 to move at an angle with respect to the seat 3. To prevent that angular movement, the plug 29 is attached to a guide 9 that maintains the plug 29 such that the face of the plug 29 is parallel to the seat 30 at all times. In FIGS. 17 and 18 the guide 9 is constrained by a cylinder that forms part of the outer cover 1), and in FIG. 19 the guide 9 is constrained by the wall 8 that restricts the spring 5. It is highly preferable that the end of the guide remains outside the cylinder that it moves in, to prevent angular forces jamming the guide 9 in the cylinder.

A hose 7 carrying the gas from the inflator to the actuators is preferably a narrow bore hose. Kynar hoses are available with a 0.8 mm bore and an outer diameter of 3.6 mm, which have the effect of limiting the maximum flow rate when used with typical BCD gas supply pressures to around 20 liters of gas flow per minute, and have a burst pressure exceeding the gas supply cylinder high pressure, such that if the first stage cylinder pressure regulator were to fail, then the hose 7 would not rupture, and therefore there is no risk of the bladder in the BCD being inflated suddenly. Moreover, use of a very small bore hose means that should the hose break, the flow rate into the bladder is much lower than the minimum vent rate if the diver uses the manual vent controls on the vent valves.

A one-way valve 31 is preferably fitted, and the one-way valve 31 is preferably of an umbrella flapper valve construction to provide a positive cracking pressure to prevent water ingress into the BCD when the valve is open.

Vent valves with the features shown namely an input 7, (pressure in which causes a piston 27 to move and open a plug or stopper 29), allowing gas in the bladder to escape through a one-way valve 31. A manual pull-dump 33 is preserved in the preferred embodiment, allowing manual operation of the vent by the diver at any time. The pull-dump cord 35 may be singular or may be combined.

A novel feature of the vent valves in the preferred embodiment is the use of a wave spring to apply even pressure to the plug 29 such that seats evenly.

The use of the wave spring reduces the difference in the spring force across the plug 29 and hence reduces the angle it tries to adopt with respect to the valve seat 30. A wave spring is a type of compression spring built from a series of thin washers that have a wave-like profile. Compressing the washers, which are normally welded together, results in having a reactive force that is even around the circumference of the spring. A wave spring can also provide a greater extension for a particular spring force and spring bound size than a conventional wire compression spring, which can be advantageous in this application.

A key feature of the vent valve is that the plug 29 is not firmly attached to the piston 27, such that pulling the plug 29 via the cord 35 causes the plug 29 to lift off the seat 30 without the piston 27 having to move. The seat at the top of the piston 27 need not be attached to the plug 29.

In all FIGS. 16-19, the valve plug 29 is not fixed to the pneumatic piston rod 20: the rod can push the inner valve plug 15 in the embodiment in FIGS. 1-2, and the main plug 29 in FIG. 19, but does not prevent over-pressure from moving the plug to open the valve, nor prevent manual actuation opening the valve.

In the case of FIG. 19, the valve plug 29 is limited in its movement by adjustment of an exterior cap to the valve to provide a limited or restricted instantaneous flow rate. In that embodiment, the instantaneous flow rate through the over-pressure action is also limited in applications where that is desirable.

In FIGS. 16-18, the automatic actuation of the valve does not move the main valve plug 29, but moves only the inner valve plug 15, through which gas flows. The instantaneous flow rate through that secondary valve comprising the inner valve plug 15 and seat is defined by choice of vent hole dimensions. This enables the automatic actuation of the valve to use a much lower instantaneous flow rate than that when the valve is opened manually or through over-pressure. For optimum automatic buoyancy control, a ratio of 8:1 or 16:1 is desired between the instantaneous flow rate in the over-pressure role and the instantaneous flow rate in the power (automated) actuation role.

The pneumatic power may be provided by an arrangement of gas valves that apply a lower gas pressure, such as 9 bar, to the hose 7 to activate the vent valve, but which in the quiescent or inactive state opens the gas line to the BCD bladder. When the gas hose 7 is a small bore hose, then the volume of the gas vented to the bladder may be kept to a negligible amount.

An alternative to the pneumatic power to activate the vent valve is by use of a bellows containing a liquid such as alcohol or water or silicone oil, and pressure on the bellows by the user causes pressure to build up in the hose 7 and the valve to be opened. The spring bias to the bellows causes the liquid to pull back the piston when the pressure is removed. The pressure may be through a lever or directly on the bellows.

The bellows or the hose 7 have a means through which gas can be drained and fluid topped up, but such means may be in the form of a nipple or filling point; there is no need for a hydraulic reservoir. During the filling process, sufficient provision should be made for the thermal expansion of the hydraulic liquid. This can be accommodated by a partial fill such that expansion of the liquid extends the bellows and contraction causes them to shrink in size, but leaving sufficient movement for the manual action.

The bellows may be implemented in a variety of forms, including a thick walled balloon such as a silicone molding, or it may be a telescoping molding, or it may be a series of telescoping elements with 0-ring seals.

FIG. 20 Shows an example of a SBCD diving vest. The vest shown advantageously includes, in particular, a controller 5 and embedded processes that may be adapted for use in the abovementioned systems. The diving vest and its associated components, including processes for controlling dive parameters that may be adapted to SBCD use, are more fully described in co-pending patent application "BUOYANCY VEST VENT VALVE WITH RELIABLE SEATING" U.S. patent application Ser. No. 15/607,609, filed May 29, 2017, the disclosure of which is incorporated herein in its entirety.

Those skilled in the art will realize that the terms for a body of water used herein including lake, ocean, sea, river, and the like and are not meant to be limiting to the particular use of the examples described herein to any particular body of water.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

What is claimed is:

1. An aquatic structure comprising:
   a mechanical structure;
   a control unit attached to the mechanical structure, the control unit including:
   one or more sensors;
   a processor; and
   memory;
   one or more valves configured to be controlled by the control unit, the one or more valves coupled to a pressurized air supply;
   a buoyancy compensation bladder configured to receive air from the pressurized air supply as controlled by the one or more valves; and
   a vent valve coupled to the control unit configured to release air from the buoyancy compensation bladder;
   wherein the control unit determines to add or release air to or from the buoyancy compensation bladder based at least in part on one or more operation functions;
   wherein the control unit is configured to control the one or more valves and the vent valve to control a volume of the buoyancy compensation bladder, the one or move valves including a main valve plug and an inner valve plug;
   wherein the main valve plug is configured to allow a first air flow; and
   wherein the inner valve plug is configured to allow a second air flow that is less than the first air flow.

2. The aquatic structure of claim 1, wherein the one or more sensors comprise a pressure sensor.

3. The aquatic structure of claim 1, wherein the one or more sensors comprise means for detecting wave motion; and
   wherein the control unit is configured to release air from the buoyancy compensation bladder in response to detecting a wave height above a threshold.

4. The aquatic structure of claim 1, wherein the one or more sensors comprise a current sensor.

5. The aquatic structure of claim 1, wherein the control unit is configured to control the one or more valves and the vent valve to control an ascent, to control a descent, and to maintain a level hold of the mechanical structure.

6. The aquatic structure of claim 1, wherein the buoyancy compensation bladder comprises a rigid body.

7. The aquatic structure of claim 6, further comprising an electric pump, wherein a buoyancy of the buoyancy compensation bladder is changed by using the electric pump for adding or removing water to an interior of the buoyancy compensation bladder.

8. The aquatic structure of claim 1, wherein the mechanical structure comprises a fin fish cage.

9. The aquatic structure of claim 1, further comprising an antenna buoy for receiving remote instructions and transmitting the remote instructions to the control unit via a cable.

10. The aquatic structure of claim 1, in which the processor is configured to operate in the one or more operation functions including one or more of a harvest bag recovery system, a lobster pot retrieval system, a salvage operations system, a unexploded bomb removal system, a hanging fishing net system, a smart buoy aqua-forest, or a controlled fish pen system.

11. The aquatic structure of claim 1, wherein the mechanical structure comprises a pen to contain sea life.

12. An aquatic structure comprising:
    a buoyancy controller;
    memory storing computer-executable instructions that, when executed, cause the buoyancy controller to perform operations comprising:
    receiving data from one or more sensors;
    receiving a first command to perform a controlled descent to a predetermined depth;
    based at least in part on the first command, opening a first vent valve to release air from a first buoyancy compensation bladder;

determining that the aquatic structure is descending based at least in part on the data;

closing the first vent valve in response to determining that the aquatic structure is descending;

determining, based at least in part on the data, a difference between a depth level of the aquatic structure and a predetermined depth level;

determining that the difference is within a threshold depth level;

actuating, based at least in part on the difference being within the threshold depth level, an inflation valve to add air to the first buoyancy compensation bladder to maintain the aquatic structure within the threshold depth level; receiving a second command to perform a roll function;

opening the inflation valve to add air to the first buoyancy compensation bladder;

opening a second vent valve to remove air from a second buoyancy compensation bladder;

determining, based at least in part on the data, that the aquatic structure is rolling; and maintaining a depth of the aquatic structure at the predetermined depth.

13. The aquatic structure of claim 12, the operations further comprising:

receiving a third command to perform a controlled ascent function;

based at least in part on the third command, opening the inflation valve to add air to the first buoyancy compensation bladder;

determining, based at least in part on the third command and the data, that the aquatic structure is ascending; and closing the inflation valve.

14. The aquatic structure of claim 13, the operations further comprising:

maintaining the aquatic structure at the predetermined depth for a predetermined amount of time.

15. The aquatic structure of claim 14, the operations further comprising:

after an elapse of the predetermined amount of time, performing the controlled ascent function.

16. The aquatic structure of claim 12, wherein the aquatic structure includes a pen to contain sea life.

17. A method to control an aquatic structure, the method comprising:

receiving a first command to configure the aquatic structure to maintain a depth underwater within a threshold depth value of a predetermined depth;

receiving sensor data indicating a first current depth level underwater at a first time;

determining that the first current depth level is above the predetermined depth;

determining, based at least in part on the sensor data, that the aquatic structure is associated with a neutral buoyancy;

opening a first vent valve to release air from a first buoyancy device of the aquatic structure;

determining an ascent rate of the aquatic structure is within a predetermined ascent rate;

closing the first vent valve;

determining that a second current depth level at a second time after the first time is within a threshold level with respect to the predetermined depth;

based at least in part on the second current depth level being within the threshold level, actuating an inflation valve to add air into the first buoyancy device;

receiving a second command to configure the aquatic structure to perform a roll function;

opening the inflation valve to add air to the first buoyancy device;

opening a second vent valve to remove air from a second buoyancy device;

determining, based at least in part on the sensor data, that the aquatic structure is rolling; and maintaining a depth of the aquatic structure at the predetermined depth.

18. The method of claim 17, further comprising:

determining that the second current depth level is deeper than the threshold level below the predetermined depth; and actuating the inflation valve to add additional air into the first buoyancy device.

19. The method of claim 18, further comprising:

determining, based at least in part on the sensor data, the aquatic structure is associated with the neutral buoyancy at the predetermined depth;

determining, at a third time after the second time, that the aquatic structure is drifting downward; and actuating the inflation valve to add additional air into the first buoyancy device.

20. The method of claim 17, further comprising:

receiving an indication that an air level of the aquatic structure is below an air threshold;

actuating the inflation valve to add a predetermined amount of air into the first buoyancy device; and transmitting a signal indicating that the air level of the aquatic structure is below the air threshold.

* * * * *